US012706088B2

(12) United States Patent
Anderson et al.

(10) Patent No.: US 12,706,088 B2
(45) Date of Patent: Aug. 11, 2026

(54) FEEDBACK SYSTEM AND METHOD FOR SPEAKER LOUDNESS CORRECTION

(71) Applicants: Georgia Tech Research Corporation, Atlanta, GA (US); EMORY UNIVERSITY, Atlanta, GA (US)

(72) Inventors: David Verl Anderson, Atlanta, GA (US); Meredith A. Caveney, Atlanta, GA (US); Reed Blevins, Atlanta, GA (US); Amanda I. Gillespie, Atlanta, GA (US); Ozioma Orjioke, Atlanta, GA (US); Sandeep Shelly, Atlanta, GA (US); Nathaniel Sundholm, Atlanta, GA (US); Adam M. Klein, Atlanta, GA (US)

(73) Assignees: Georgia Tech Research Corporation, Atlanta, GA (US); EMORY UNIVERSITY, Atlanta, GA (US)

( * ) Notice: Subject to any disclaimer, the term of this patent is extended or adjusted under 35 U.S.C. 154(b) by 152 days.

(21) Appl. No.: 18/659,809

(22) Filed: May 9, 2024

(65) Prior Publication Data

US 2024/0379093 A1 Nov. 14, 2024

Related U.S. Application Data

(60) Provisional application No. 63/501,131, filed on May 9, 2023.

(51) Int. Cl.
*G10L 15/00* (2013.01)
*G01N 29/14* (2006.01)
(Continued)

(52) U.S. Cl.
CPC .............. *G10L 15/08* (2013.01); *G01N 29/14* (2013.01); *G10L 15/22* (2013.01); *G10L 2015/225* (2013.01)

(58) Field of Classification Search
CPC ......... G10L 19/02; G10L 25/78; G10L 15/02; G10L 25/90; G10L 21/038; G10L 15/07;
(Continued)

(56) References Cited

U.S. PATENT DOCUMENTS 9,363,596 B2 * 6/2016 Dusan ................. G10L 21/0216
9,800,973 B1 * 10/2017 Chatot .................. H04R 3/005
(Continued)

OTHER PUBLICATIONS

"Instruction Manual for VocaLog 2TM Vocal Activity Monitor," VocaLog.com.[Online]. Available:http://www.vocalog.com/VL2_Help/VocaLog2_Help.html. [Accessed: Apr. 12, 2020].
(Continued)

*Primary Examiner* — Vu B Hang
(74) *Attorney, Agent, or Firm* — Meunier Carlin & Curfman LLC

(57) ABSTRACT

An exemplary system and method for a head-worn device for augmenting speech therapy or mitigating Parkinson's effect or other speech-impairing conditions by providing haptic feedback, vibratory feedback, audio feedback, or other stimulations to a wearer by isolating and analyzing vocal/speech output of the user for signal-associated assessment, including, e.g., based on timing, direction, loudness, and/or speaking rate. The haptic biofeedback and/or acoustic/vibratory feedback are beneficially provided to the wearer when (i) certain minimum threshold targets, e.g., relating to the user's loudness or speech rate are not met or (ii) when certain thresholds are exceeded, e.g., for loudness, intensity, or speech rate. The system and method can additionally isolate a detected speech or sound and determine if it is from the user. As a signal-assessment analysis system and method, the implementation can be performed with minimal computation power or resources, e.g., as compared to speech or voice recognition technology.

20 Claims, 15 Drawing Sheets

(51) Int. Cl.
*G10L 15/08* (2006.01)
*G10L 15/22* (2006.01)

(58) Field of Classification Search
CPC ......... G10L 15/20; G10L 15/22; G10L 15/26; G10L 15/30; G10L 15/063; G10L 15/16; G10L 19/005; G10L 19/00; G10L 25/27; G10L 25/30; G10L 15/12; G10L 25/87; G10L 21/0208; G10L 15/08; G10L 17/02; G10L 17/06; G10L 15/187; G10L 15/183; G10L 2015/225; G10L 21/16; H04R 1/406; H04R 3/005; G01N 29/14; A61F 11/045
See application file for complete search history.

(56) References Cited

U.S. PATENT DOCUMENTS

| | | | | |
|---|---|---|---|---|
| 10,182,760 | B2 | 1/2019 | Nicoletti et al. | |
| 10,314,529 | B2 | 6/2019 | Vandam | |
| 11,138,981 | B2 * | 10/2021 | Brown .................... | G10L 15/06 |
| 11,617,048 | B2 * | 3/2023 | Littrell .................... | G10L 25/78<br>381/58 |
| 2017/0112452 | A1 * | 4/2017 | Otto ..................... | A61B 5/7221 |
| 2019/0105217 | A1 | 4/2019 | Prattichizzo et al. | |
| 2019/0209022 | A1 | 7/2019 | Sobol et al. | |
| 2022/0039673 | A1 | 2/2022 | Sobol et al. | |
| 2022/0330844 | A1 | 10/2022 | Litvak et al. | |

OTHER PUBLICATIONS

A. Nacci, B. Fattori, V. Mancini, E. Panicucci, F. Ursino, F.M. Cartaino, S. Berrettini, "The use and role of the Ambulatory Phonation Monitor (APM) in voice assessment," Acta Otorhinolaryngologica Italica, vol. 33, pp. 49-55, 2013.

J.V. Stan, J. Gustafsson, E. Schalling, R.E. Hillman, "Direct Comparison of Three Commercially Available Devices for Voice Ambulatory Monitoring and Biofeedback," Perspectives on Voice and Voice Disorders, vol. 24, No. 2, Jul., pp. 80-86, 2014.

"Sonneta Voice Monitor," Soft112.com. [Online]. Available: https://sonneta-voice-monitorios. soft112.com/. [Accessed: Apr. 12, 2020].

UI Devices, "MEMS Microphone," CMM-2718AT-42108 datasheet, Jan. 2020. [Online]. Available: https://www.cuidevices.com/product/resource/cmm-2718at-42108-tr.pdf [Accessed: Apr. 15, 2020].

Bosch, "Digital, Triaxial Acceleration sensor," BMA280 datasheet, Aug. 2019. [Online]. Available: https://ae-bst.resource.bosch.com/media/_tech/media/datasheets/BST-BMA280-DS000.pdf [Accessed: Apr. 15, 2020].

Digikey, "Vibrating Mini Motor Disc," 1201 Motor datasheet, Jul. 2015. [Online]. Available: https://media.digikey.com/pdf/Data%20Sheets/Adafruit%20PDFs/1201_Web.pdf [Accessed: Apr. 15, 2020].

"ISO 13485:2016 Medical devices—Quality management systems—Requirements for regulatory purposes," ISO, Jan. 21, 2020. [Online]. Available: https://www.iso.org/standard/59752.html. [Accessed: Apr. 9, 2020].

"ISO/IEC 9899:2018 Information technology—Programming languages—C," ISO, Jul. 5, 2018. [Online]. Available: https://www.iso.org/standard/74528.html. [Accessed: Apr. 9, 2020].

"ISO 10993-1:2018," ISO Biological evaluation of medical devices—Part 1: Evaluation and testing within a risk management process, Nov. 1, 2018. [Online]. Available: https://www.iso.org/standard/68936.html. [Accessed: Apr. 14, 2020].

"ISO/IEEE 11073-20702:2018 Health informatics—Point-of-care medical device communication—Part 20702: Medical devices communication profile for web services," ISO, Aug. 28, 2018. [Online]. Available: https://www.iso.org/standard/74703.html. [Accessed: Apr. 9, 2020].

"ANSI/AAMI ES60601-1:2005/(R)2012 Medical electrical equipment—Part 1: General requirements for basic safety and essential performance," AAMI, 2013. Abstract.

B. L., "H.R.4040—110th Congress (2007-2008): Consumer Product Safety Improvement Act of 2008," Congress.gov, Aug. 14, 2008. [Online]. Available: https://www.congress.gov/bill/110th-congress/house-bill/4040. [Accessed: Apr. 15, 2020].

M. Strålin, "Classification Of Medical Devices And Their Routes To CE Marking," CE Check Support—Product and CE marking information, Feb. 2020. [Online]. Available: https://support.ce-check.eu/hc/en-us/articles/360008712879-Classification-Of-Medical-Devices-And-Their-Routes-To-CE-Marking. [Accessed: Apr. 15, 2020].

"RoHS Guide," 2020 RoHS Compliance Guide: Regulations, 10 Substances, Exemptions. [Online]. Available: https://www.rohsguide.com/. [Accessed: Apr. 14, 2020]. Updated Nov. 2024.

Gemma Moya-Gale and Erika S Levy, "Parkinson's disease-associated dysarthria: prevalence, impact and management strategies," Dovepress: Research and Reviews in Parkinsonism, May 2019. [Abstract]. Available: https://www.dovepress.com/ [Accessed Apr. 13, 2020].

* cited by examiner

FEEDBACK SYSTEM AND METHOD FOR SPEAKER LOUDNESS CORRECTION

CROSS-REFERENCE TO RELATED APPLICATIONS

This application claims priority to and the benefit of U.S. Provisional Application No. 63/501,131, titled "FEEDBACK SYSTEM AND METHOD FOR SPEAKER LOUDNESS CORRECTION," filed on May 9, 2023, the content of which is hereby incorporated by reference herein in its entirety.

BACKGROUND

Parkinson's disease severely impacts communication in 70-90% of patients. Behavioral voice therapy can be effective in Parkinson's-related voice and speech disorders by increasing vocal loudness and improving speech intelligibility. However, success in treatment is dependent on an intensive intervention schedule of four weekly sessions over four weeks duration with inter-session home practice. This treatment burden, combined with the reduced ability of patients with Parkinson's to self-monitor voice and speech, leads to a high rate of symptomatic relapse following treatment.

There is a benefit to improving therapy for Parkinson's related voice and speech disorders.

SUMMARY

An exemplary system and method are disclosed for a head-worn device for augmenting speech therapy or mitigating Parkinson's effect on speech and other speech-impairing conditions by providing haptic feedback, vibratory feedback, audio feedback, or other stimulations to a wearer by isolating and analyzing vocal/speech output of the user for signal-associated assessment, including, e.g., based on timing, direction, loudness, and/or speaking rate. The haptic biofeedback and/or acoustic/vibratory feedback are beneficially provided to the wearer when (i) certain minimum threshold targets, e.g., relating to the user's loudness or speech rate are not met or (ii) when certain thresholds are exceeded, e.g., for loudness, intensity, or speech rate. The system and method can additionally isolate a detected speech or sound and determine if it is from the user. As a signal-assessment analysis system and method, the implementation can be performed with minimal computation power or resources, e.g., as compared to speech or voice recognition technology.

The system may be implemented in a headset form factor or may be worn on other parts of the body, such as around the neck or head, e.g., as a collar or hat. To detect or determine directionality as a proxy to whether a measured sound originated from the user, another person, or environment, the exemplary system includes multiple acoustic sensors located at two or more locations or in an acoustic array disposed on the head-worn device that can employ beamforming or comparative operations from two of the sensors to assess the acoustic power level in a direction toward the wearer's face, with the second or third sensor (or a portion of the acoustic array) providing input in another direction to determine if the origin of a sound is from a different source, such as a person standing in front of the wearer.

The exemplary method and system may be used as a therapy aid for those suffering from Parkinson's Disease or other voice disorders described or referenced herein. A study was conducted that developed a prototype (e.g., referenced herein as Speech-Assisting Multi-Microphone System (SAMMS)) with real-time data display and biofeedback, and enhanced form factor for comfort, that can assist Parkinson's patients in determining and prompting the patient when their voice is too low. The device was validated with patient and caregiver input for ecological validity and clinical feasibility. It is contemplated that the system can be used over a prolonged period for patients with Parkinson's disease.

Additional advantages of the disclosed systems and methods will be set forth in part in the description that follows and, in part, will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed compositions and methods, as claimed.

In an aspect, a wearable speech-assisting device comprising a plurality of acoustic sensors to be placed on a wearer, including a first acoustic sensor and a second acoustic sensor; and one or more feedback elements; a processor operatively coupled to the plurality of acoustic sensors and the one or more feedback elements, the processor being configured to: receive a plurality of audio signals via the plurality of acoustic sensors, including at least a first audio signal from the first acoustic sensor and a second audio signal from the second acoustic sensor; perform an active beamforming operation or comparative signal operation on the received audio signals to determine whether the received audio signals substantially originated from the wearer and/or reject the audio signals in response to determining that the audio signals originate from another source; determine whether the wearer's speech signal satisfies one or more speech parameters; and in response to detecting that the wearer's speech signal fails to satisfy at least one predetermined threshold of at least one speech parameter for a specified time period, output feedback to the wearer via the one or more feedback elements.

In some embodiments, the one or more speech parameters include at least one of an acoustic intensity parameter, a speech rate parameter, pitch, speech duration, voice quality, or response time.

In some embodiments, at least one of the feedback elements comprises at least one haptic biofeedback element, wherein the processor is further configured to output haptic biofeedback via the at least one haptic biofeedback element.

In some embodiments, the processor is further configured to, in response to detecting that the wearer's speech signal satisfies the at least one predetermined threshold, stop providing the haptic biofeedback to the wearer.

In some embodiments, the processor is further configured to perform a noise reduction operation on the received audio signals.

In some embodiments, the first acoustic sensor is positioned in closer proximity to the wearer's mouth than the second acoustic sensor and the device is configured to detect the wearer's speech signal based on at least the first and second acoustic sensors, and wherein two or more of the plurality of acoustic sensors form an acoustic array that is used to isolate the wearer's speech signal.

In some embodiments, the second acoustic sensor is positioned on a wearer's head or upper body, and wherein the first acoustic sensor is positioned on a wearer's head or upper body in closer proximity to the wearer's mouth than the second acoustic sensor.

In some embodiments, the processor is further configured to isolate the wearer's speech signal based on a determined difference between respective energy amounts from the first acoustic sensor, the second acoustic sensor, and/or at least a third acoustic sensor.

In some embodiments, the third acoustic sensor is positioned on a first side of the wearer's head or upper body.

In some embodiments, the first acoustic sensor and the third acoustic sensor are positioned on opposite sides of the wearer's head or upper body in a beamforming configuration.

In some embodiments, the wearable speech-assisting device is operatively coupled to a beamformer that is configured to assess an acoustic power level in the direction of the wearer's face.

In some embodiments, the processor is further configured to determine whether the wearer's speech signal satisfies an acoustic intensity parameter or speech rate parameter based on an amount of energy in the wearer's speech signal.

In some embodiments, the at least one predetermined threshold for the acoustic intensity parameter comprises a low acoustic intensity level and a high acoustic intensity level, and wherein the at least one predetermined threshold for the speech rate parameter comprises a low speech rate level and a high speech rate level.

In some embodiments, the processor is further configured to record and store at least a portion of the audio signals, the wearer's speech signal, and/or feedback data.

In some embodiments, the processor is further configured to output at least a portion of the stored data to another computing device for analysis or display.

In some embodiments, the wearable speech-assisting device is embodied as a wearable headset and/or neck device.

In some embodiments, one or more of the plurality of acoustic sensors comprises a micro-electromechanical systems (MEMS) microphone.

In some embodiments, the wearable speech-assisting device is employed as a therapy aid.

In another aspect, a method is disclosed comprising receiving a plurality of audio signals including at least a first audio signal via a a first acoustic sensor and a second audio signal via a second acoustic sensor; performing an active beamforming operation or comparative signal operation on the received audio signals to determine whether the received audio signals substantially originated from the wearer and/or reject the audio signals in response to determining that the audio signals originate from another source; determining whether the wearer's speech signal satisfies one or more speech parameters including at least one of an acoustic intensity parameter or a speech rate parameter; and in response to detecting that the wearer's speech signal fails to satisfy at least one predetermined threshold of at least one of the speech parameters for a specified time period, output feedback to the wearer via one or more feedback elements.

In another aspect, a non-transitory computer readable medium is disclosed comprising a memory having instructions stored thereon to cause a processor to: receive a plurality of audio signals including at least a first audio signal via a first acoustic sensor and a second audio signal via a second acoustic sensor; perform an active beamforming operation or comparative signal operation on the received audio signals to determine whether the received audio signals substantially originated from the wearer and/or reject the audio signals in response to determining that the audio signals originate from another source; determine whether the wearer's speech signal satisfies one or more speech parameters including at least one of an acoustic intensity parameter or a speech rate parameter; and in response to detecting that the wearer's speech signal fails to satisfy at least one predetermined threshold of at least one of the speech parameters for a specified time period, output feedback to the wearer via one or more haptic feedback elements.

BRIEF DESCRIPTION OF THE FIGURES

The components in the drawings are not necessarily to scale relative to each other. Like reference, numerals designate corresponding parts throughout the several views.

DETAILED SPECIFICATION

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entirety and to the same extent as if each reference was individually incorporated by reference. To facilitate an understanding of the principles and features of various embodiments of the present disclosure, they are explained hereinafter with reference to their implementation in illustrative embodiments.

Embodiments of the present disclosure provide systems and devices, such as a wearable speech-assisting device, that can be used to isolate, monitor, and analyze vocal output in order to provide feedback to a wearer. The example device can be configured to provide haptic biofeedback and/or acoustic feedback to the wearer when minimum speech parameter thresholds are not met.

Other embodiments of the present disclosure have applications to a variety of wearable monitoring and feedback scenarios. In one embodiment, the wearer's detected speech could be monitored for other conditions needing treatment, including mumbling, strained speech, speech disfluencies, vocal disorders, or other communication disorders. In another embodiment, the wearer's response to sounds in the environment can be monitored, including the frequency and duration of responses to inquiries (useful in autism diagnosis and treatment), and responses to certain trigger sounds for treatment of post-traumatic stress disorder (PTSD) sufferers. In some implementations, the feedback given to a user may contain additional information delivered audibly or visually (e.g., via a mobile device).

Example System

Figure 1:
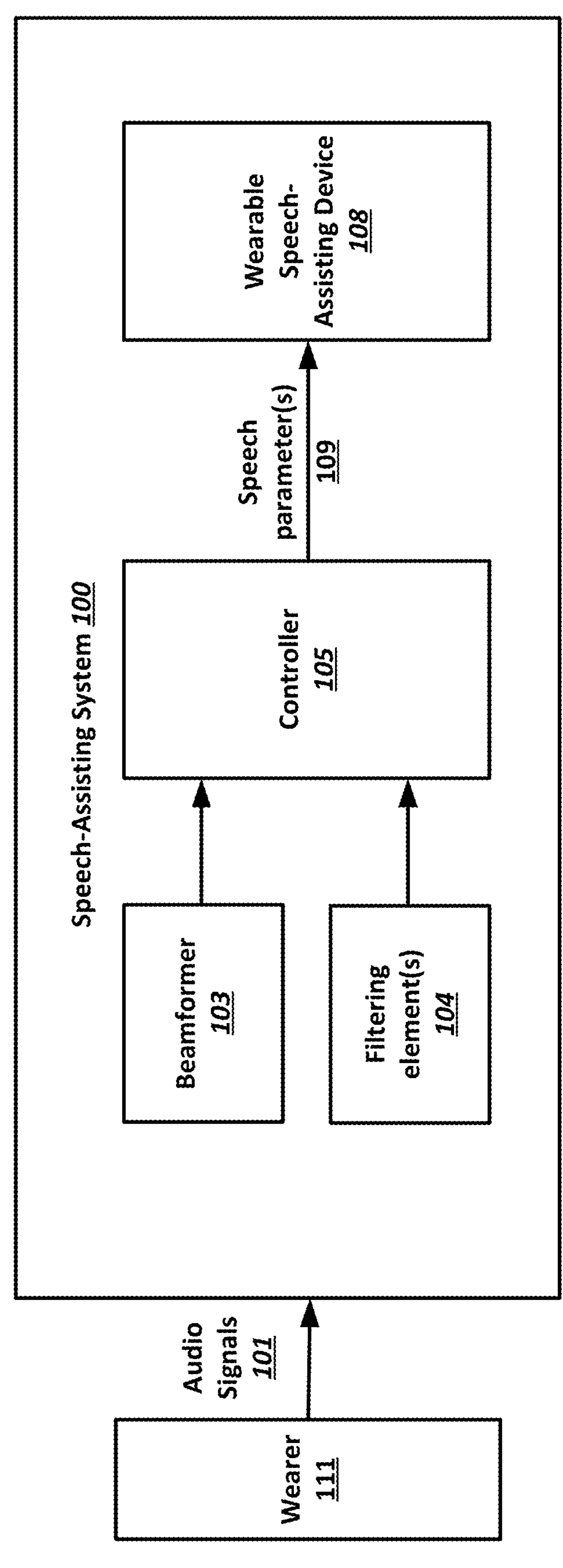
FIG. 1 is an example speech-assisting system in accordance with an illustrative embodiment.

FIG. 1 shows an example system 100 (e.g., for a Speech-Assisting Multi-Microphone System (SAMMS)) configured for real-time control of a wearable speech-assisting device 108, that can continuously analyze a wearer's speech/voice and provide feedback (e.g., haptic biofeedback and/or audio/visual feedback) in response to certain detected speech/voice parameters. The system 100 is configured to monitor a wearer's 111 (i.e., subject, user, patient) speech/voice as audio signals 101 via multiple acoustic sensors and continuously perform real-time analysis of the audio signals 101. In the example shown in FIG. 1, the system 100 is configured to receive audio signals 101 (e.g., having first, second, and third signals from a corresponding set of three or more sensors), condition the audio signals 101 (e.g., filter the background noise, perform an active beamforming operation and/or perform a comparative signal operation on at least a first audio signal associated with a first acoustic sensor and a second audio signal associated with a second acoustic sensor), determine whether the audio signals 101 satisfy one or more speech/voice parameters 109, and provide feedback (e.g., haptic feedback and/or audio feedback) responsive to detecting certain speech parameters 109. In some embodiments, the speech/voice parameters are assessed to determine if they are below a threshold or above a threshold.

The terms "speech," "voice," and "utterances" are interchangeably used herein to refer to vocalizations or sounds generated by a user to which physical measurements are made as an audio signal to which physical properties such as loudness, intensity, rate, directionality, or a combination thereof can be evaluated without an assessment for semantics or meaning. In some embodiments, the exemplary system can provide the acquired audio signals for semantic analysis, e.g., voice or speech recognition. In some embodiments, the exemplary system can perform voice or speech recognition that can be used to augment the noted physical assessment for feedback output.

The system 100 can record at least a portion of the audio signal as data, data relating to the haptic biofeedback data provided, speech parameters (e.g., amplitude), or a combination thereof, for example, on an SD card for subsequent analysis.

In FIG. 1, the wearable speech-assisting device 108 is employed as a speech/vocalization/voice therapy aid and can be embodied as a wearable headset, neck collar, and/or hat device. The device includes sensors at locations circumferential to the head to determine directionality. In some embodiments, the wearable speech-assisting device 108 includes a belt-pack system that operates with the headset to improve comfort, wearability, usability, and/or robustness to the wearer 111 experience. The system 100 includes a beamformer or comparator circuit (shown as beamformer 103), one or more filters 104, a controller 105, and a wearable speech-assisting device 108.

As shown in FIG. 1, the system 100 acquires a plurality of audio signals 101 from a wearer 111, for example, via a plurality of acoustic sensors that are placed in proximity to or on the wearer 111. The system performs an active beamforming operation and/or comparative signal operation on the received audio signals (e.g., via beamformer 103 and/or controller 105) to determine whether the received audio signals 101 originate from the wearer 111 or from another person or the environment by assessing an acoustic power level in the direction of the wearer's face. The system 100 can either (i) validate the audio signals 101 in response to determining that the audio signals originate from the wearer 111 and provide the audio signal for further assessment (or allow the assessment to generate an output) or (ii) reject the audio signals 101 in response to determining that the audio signals do not originate from the wearer 111 and exclude the audio signal from such assessment or action. In some implementations, the system 100 performs a noise reduction operation on the audio signals 101 (e.g., via one or more filters 104).

As shown, the controller 105 tracks one or more speech parameters 109 associated with the wearer's 111 audio signals 101. For example, for Parkinson's patients, the controller 105 can track an acoustic intensity parameter, a speech rate parameter, among others to determine whether the speech parameters 109 satisfy at least one predetermined threshold in being above a threshold for a specified time period (e.g., three seconds, five seconds), e.g., to prompt the user to repeat the latest utterance or to speak louder. The prompt may be user-definable.

For autistic patients, the controller 105 can track an acoustic intensity parameter, a speech rate parameter to determine whether the speech parameters 109 satisfy at least one predetermined threshold in being below a threshold for a specified time period (e.g., three seconds, five seconds), e.g., to prompt the user to speak slower or more calmly.

In response to determining that at least one speech parameter 109 fails to satisfy a respective predetermined threshold, the controller 105 outputs a haptic biofeedback to the wearer (e.g., via one or more haptic biofeedback elements of the wearable speech-assisting device 108). Additionally, and/or alternatively, other forms of feedback can be provided, including audio feedback and/or visual feedback. The system 100 can be configured to output corresponding user interface data, for example, via an application (App) executing on a mobile device. The data may be viewed by the user or a clinician.

The wearable speech-assisting device 108 comprises a plurality of acoustic sensors, e.g., micro-electromechanical systems (MEMS) microphone. In some implementations, a first acoustic sensor is positioned on a first side of or in front of the wearer's head or upper body, and a second acoustic sensor is positioned on the opposite side of the wearer's head or upper body in a beamforming configuration. In some embodiments, at least some of the plurality of acoustic sensors (e.g., two or more acoustic sensors) form an acoustic array that is used to isolate the wearer's speech signal from the audio signal. In another example, a first acoustic sensor can be positioned on a side of the wearer's head or upper body, and a second acoustic sensor can be positioned behind the wearer's head or upper body.

In some implementations, another microphone can be added on one side of the head behind the first microphone. In some examples, the microphone on the opposite side of the head can be eliminated. This rear microphone allows the device to distinguish the wearer's voice from nearby speakers or noise sources by responding only to sounds that appear louder in the forward microphone than in the rear microphone. In some implementations, the system is configured to provide feedback to the user on an intermittent basis. Early tests found that users habituated to continual feedback and the therapeutic benefit was diminished. By responding only when the speech levels have not met the established criteria for a period of time and/or when other conditions are met that reduce the number of feedback events, the effectiveness of the device is improved. In some implementations, the system can observe the modulation of the short-term energy in the wearer's speech signal to assess speaking rate and articulation and provide feedback when these measures do not meet established thresholds. In some implementations, the system can be adjusted by a therapist to set appropriate thresholds prior to normal operation. The target speaking thresholds may include a lower threshold below which the system does not respond and an upper threshold corresponding to the target speaking level. Objective articulation measures may be utilized to analyze captured speech and provide feedback to the wearer.

Example Speech-Assisting Multi-Microphone System

Figure 2A:
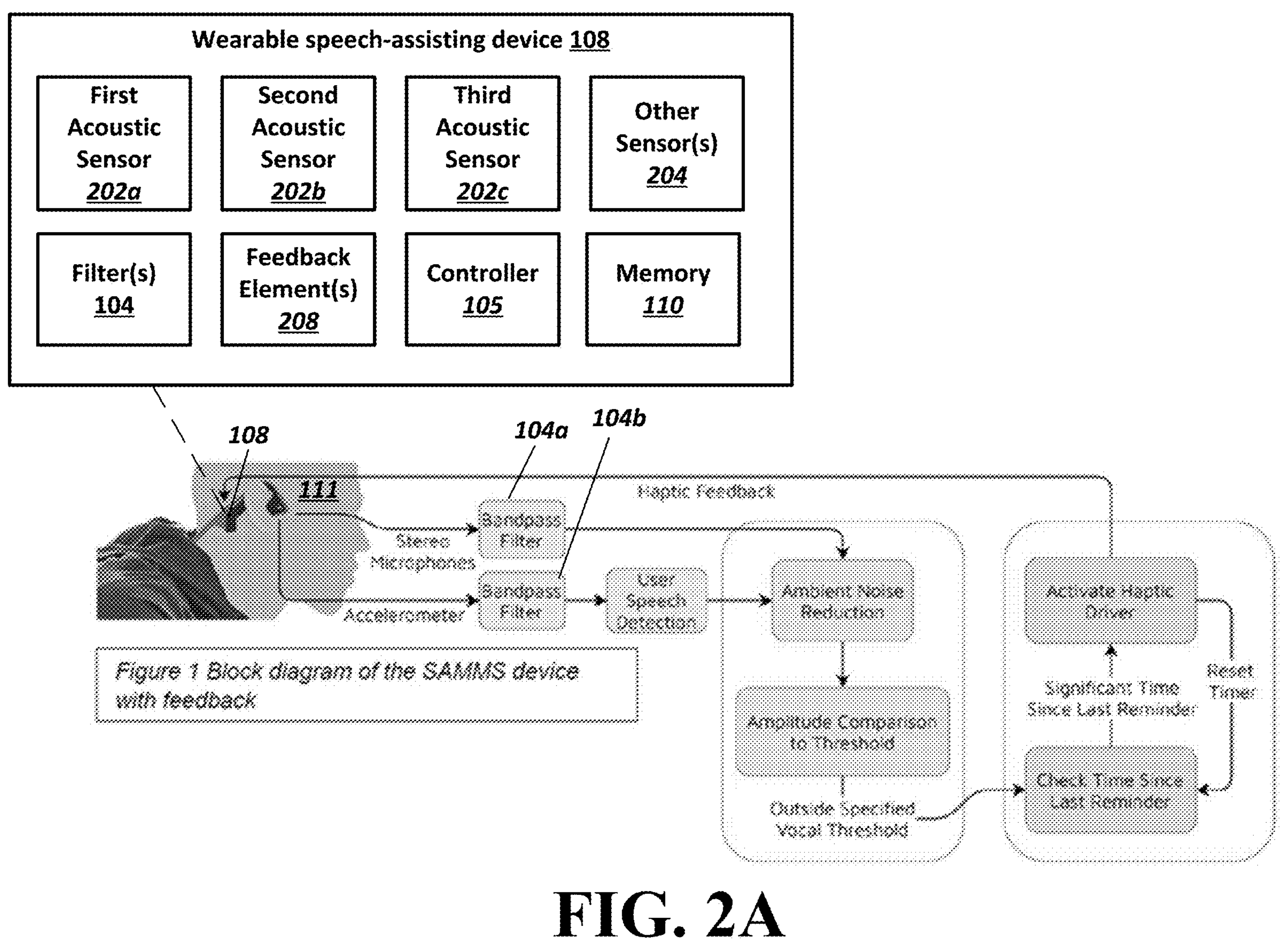
FIG. 2A is a schematic diagram showing a wearable speech-assisting device in accordance with an example implementation.

FIG. 2A is a schematic diagram showing an example wearable speech-assisting device 108 in accordance with an example implementation. As illustrated, the wearable speech-assisting device 108 comprises a plurality of acoustic sensors (first acoustic sensor 202*a*, second acoustic sensor 202*b*, third acoustic sensor 202*c*), including at these three sensors. This disclosure contemplates that a wearable speech-assisting device 108 can include more than three acoustic sensors, e.g., 4, 5, 6, 7, 8, or more, in addition to one or more additional sensors 204 (e.g., accelerometers, gyroscopes, inertial measurement units, combinations thereof, and/or the like).

In some embodiments, the additional sensor(s) 204 include an accelerometer that facilitates accelerometer-based voice monitoring. As further depicted, the wearable speech-assisting device 108 includes one or more filters 104 (e.g., first bandpass filter 104*a*, and second bandpass filter 104*b*), one or more feedback elements 208 (e.g., haptic elements, audio/visual elements, and/or the like), a controller 105, and a memory 110 (e.g., SD card). In some implementations, the feedback elements 208 may be separate from the wearable speech-assisting device 108. For example, the feedback elements 208 can be part of a mobile or other computing device. The wearable speech-assisting device 108 can perform an active beamforming operation and/or comparative signal operation via the plurality of acoustic sensors to isolate the wearer's speech signal.

In some embodiments, the three acoustic sensors (first acoustic sensor 202*a*, second acoustic sensor 202*b*, third acoustic sensor 202*c*) are microphones, for example, a bone conduction microphone and two acoustic microphones. In one implementation, the bone-conduction microphone detects speech, and the two acoustic microphones are used as an array to isolate the speech for determining whether the wearer's speech signal satisfies one or more speech parameters. Additionally, the wearable speech-assisting device 108 includes one or more feedback elements 208 that provide stimulation to the wearer 111, for example, when they are speaking too quietly, too loudly, too fast, or too slowly. In some implementations, the wearable speech-assisting device 108 is operatively coupled to a computing device (e.g., an App executing on a mobile device) that facilitates real-time monitoring of the wearer's speech. For example, the computing device may provide additional data on the wearer's speech to the wearer or another user (e.g., clinician). In some embodiments, the wearable speech-assisting device 108 includes a skin vibration sensor configured to pick up voice activity from the wearer 111. The feedback to the wearer 111 may be provided through a vibrator and/or may include audio feedback (e.g., a beep).

In some implementations, as depicted in FIG. 2A, the wearable speech-assisting device 108 is configured to perform a noise reduction operation to reduce ambient noise, and determine whether the wearer's speech signal satisfies one or more speech parameters, for example, by comparing an amplitude of the wearer's speech signal to a predetermined threshold. In response to detecting that the wearer's speech signal is outside at least one specified speech/vocal threshold, the wearable speech-assisting device 108 activates a haptic driver. The wearable speech-assisting device 108 can implement a timer to continuously set and reset a timer to track the last time that a reminder/feedback was provided.

Figure 2B:
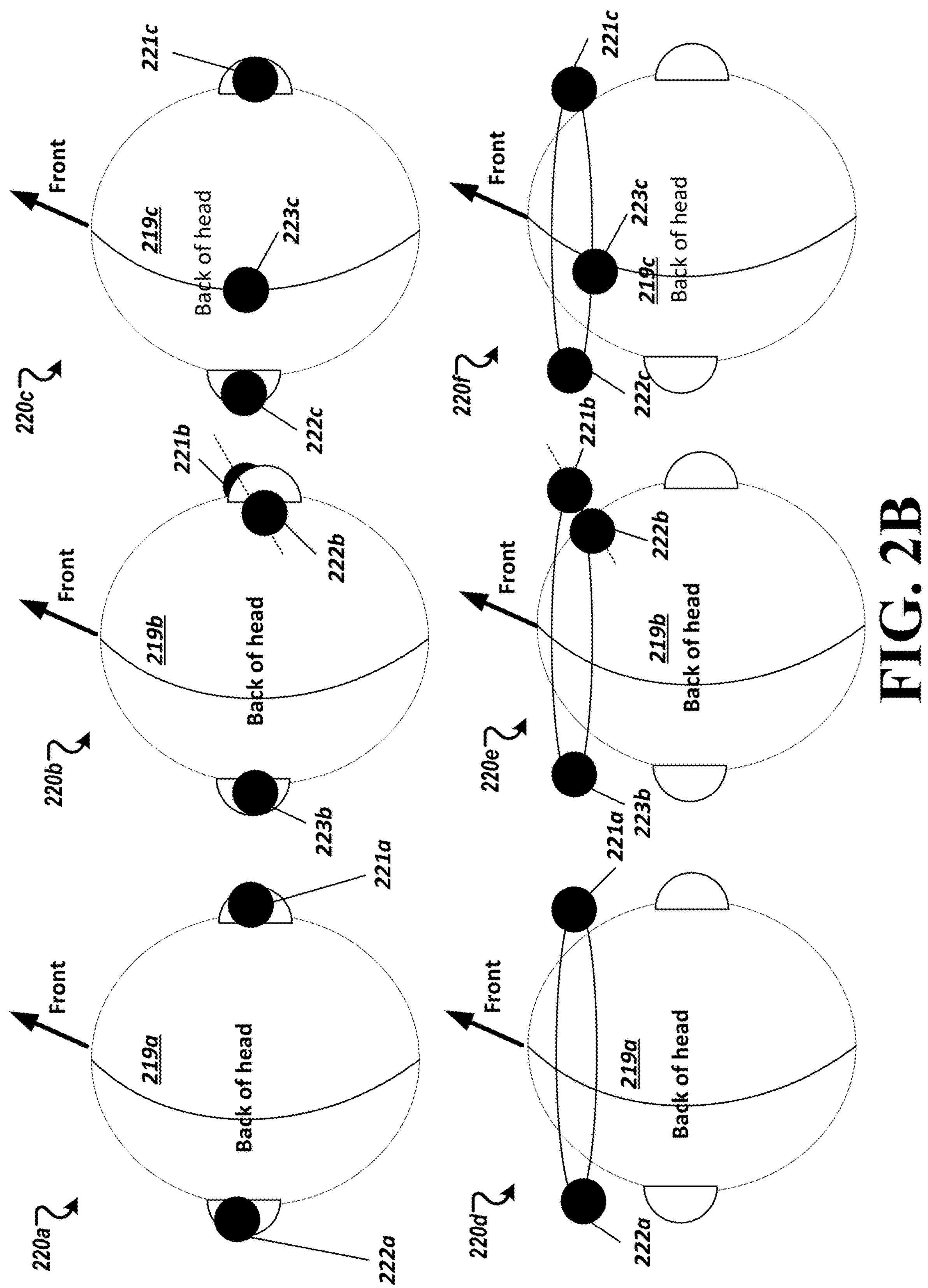
FIG. 2B is a schematic diagram showing configurations of example wearable speech-assisting device sensors in accordance with certain embodiments described herein.
Figure 2B:
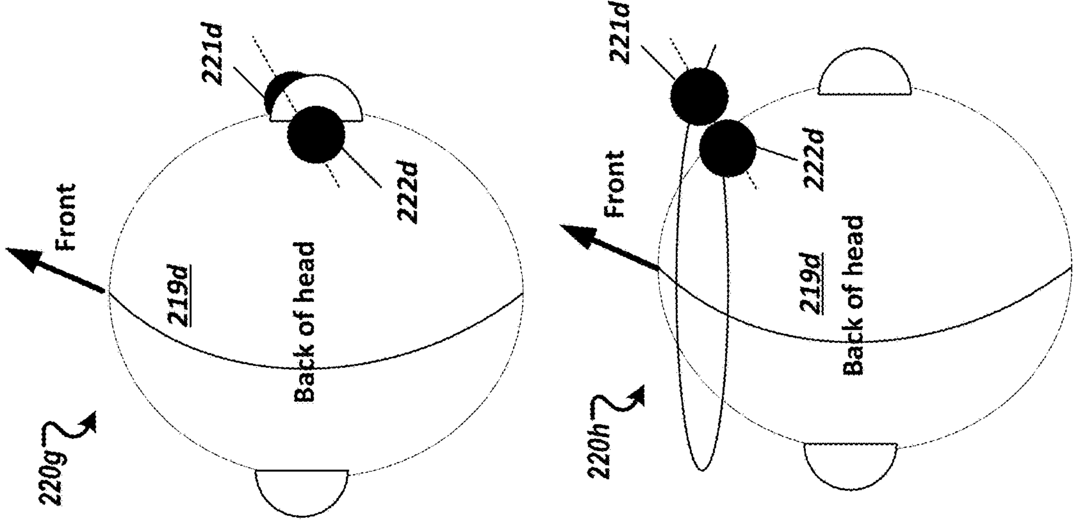

In various implementations, the wearable speech-assisting device can be configured with acoustic sensors and other types of sensors (e.g., accelerometers or vibration sensors) to implement a variety of beamforming and/or noise reduction arrangements. FIG. 2B is a schematic diagram showing various rear views of a wearer's head with different sensor configurations.

Example #1. A first configuration 220*a* shows a rear view of the wearer's head 219*a* having a first acoustic sensor 221*a* positioned adjacent to (e.g., close to or over) the wearer's right car and a second acoustic sensor 222*a* positioned adjacent to (e.g., close to or over) the wearer's left ear. Configuration 220*d* shows the same configuration as 220*a* but offset to the top portion of the head, e.g., in a hat. The same sensor configuration can be employed in a collar placed at the neck of the user.

Example #2. A second configuration 220*b* shows a rear view of the wearer's head 219*b* having a first acoustic sensor 221*b* positioned adjacent to and in front of the wearer's right ear (forward facing from the wearer's face) and a second acoustic sensor 222*b* positioned behind the wearer's right ear. In other words, the first acoustic sensor 221*b* is positioned in closer proximity to the wearer's mouth than the second acoustic sensor 222*b*. The configuration can be similarly implemented for the left ear. Optionally, the second configuration 220*b* shows a third acoustic sensor 223*b* positioned adjacent to the wearer's left ear. That is, the second configuration 220*b* does not necessarily include the third acoustic sensor 223*b* (see also the seventh configuration 220*g* described in Example #4 below which only includes two sensors). Configuration 220*e* shows the same configuration as 220*b* but offset to the top portion of the head, e.g., in a hat. The same sensor configuration can be employed in a collar placed at the neck of the user.

Example #3. A third configuration 220*c* shows a rear view of the wearer's head 219*c* having a first acoustic sensor 221*c* positioned adjacent to (e.g., close to, over) the wearer's right car and a second acoustic sensor 222*c* positioned adjacent to (e.g., close to, over) the wearer's left ear. Additionally, the third configuration 220*c* shows a third acoustic sensor 223*c* positioned centrally behind the wearer's head 219*c* (e.g., close to the wearer's neck). Configuration 220*f* shows the same configuration as 220*c* but offset to the top portion of the head, e.g., in a hat. The same sensor configuration can be employed in a collar placed at the neck of the user.

Example #4. A fourth configuration 220*g* shows a rear view of the wearer's head 219*d* having a first acoustic sensor 221*d* positioned adjacent to and in front of the wearer's right ear (forward facing from the wearer's face) and a second acoustic sensor 222*d* positioned behind the wearer's right ear. In other words, the first acoustic sensor 221*d* is positioned in closer proximity to the wearer's mouth than the second acoustic sensor 222*d*. Configuration 220*h* shows the same configuration as 220*g* but offset to the top portion of the head, e.g., in a hat. The same sensor configuration can be employed in a collar placed at the neck of the user.

This disclosure contemplates additional configurations that are not shown in FIG. 2B. For example, any of the acoustic sensors depicted in FIG. 2B can be vibration sensors, accelerometers, or other types of sensors. Additionally, any of the sensors can be positioned on another portion of the wearer's upper body instead of the head.

In some implementations, the wearable speech-assisting device is a belt-pack system (not shown) comprising a plastic casing containing a digital signal processor (DSP) and a battery pack. In some implementations, the data collected from the headset is stored on an SD card on the DSP. The SD card has two text files: one created by the therapist to designate the threshold type and level, and one to store the patient's SPL data over the course of each week. The belt pack system is wired to the headset, which sits directly above the cars, looping behind the head, as illustrated in FIG. 2C.

Figure 2C:
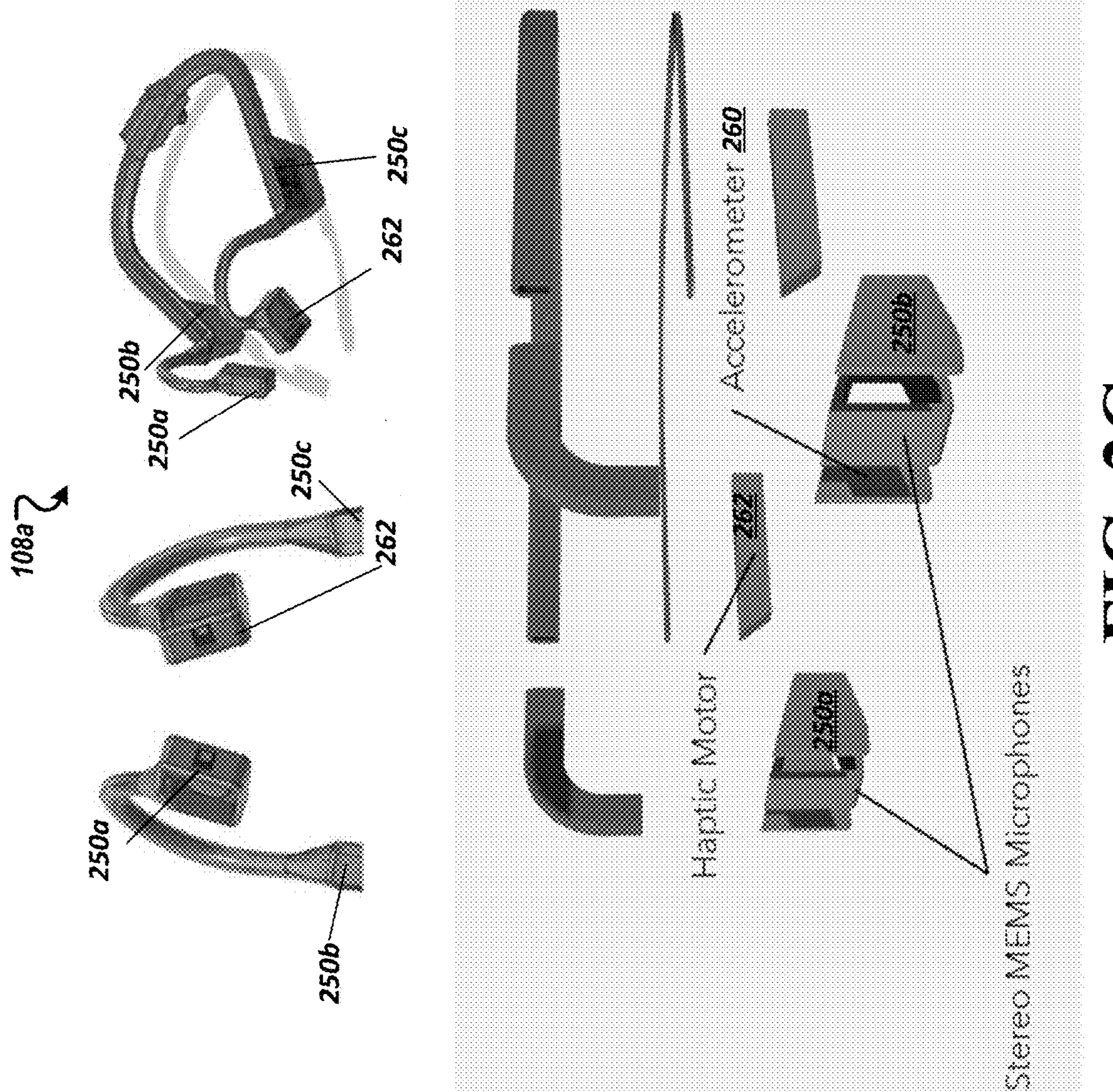
FIG. 2C is a schematic diagram showing views of an example wearable speech-assisting device in accordance with certain embodiments described herein.

FIG. 2C is a schematic diagram showing two views of an example wearable speech-assisting device 108 (shown as 108*a*) in accordance with certain embodiments described herein. In the example shown in FIG. 2C, the wearable speech-assisting device 108*a* includes a first acoustic sensor 250*a* (stereo MEMS microphone), a second acoustic sensor 250*b*, an accelerometer 260, and a haptic feedback motor 262. The first and second acoustic sensors 250*a*, 250*b* (stereo MEMS microphones) are used to implement beamforming to reduce unwanted noise from the environment. A high bandwidth accelerometer 260 acts as a bone conduction microphone that can accurately detect when the patient is speaking, and the haptic feedback motor 262 is controlled through a haptic driver integrated circuit (IC) through pulse-width modulation (PWM).

Example Method

Figure 3A:
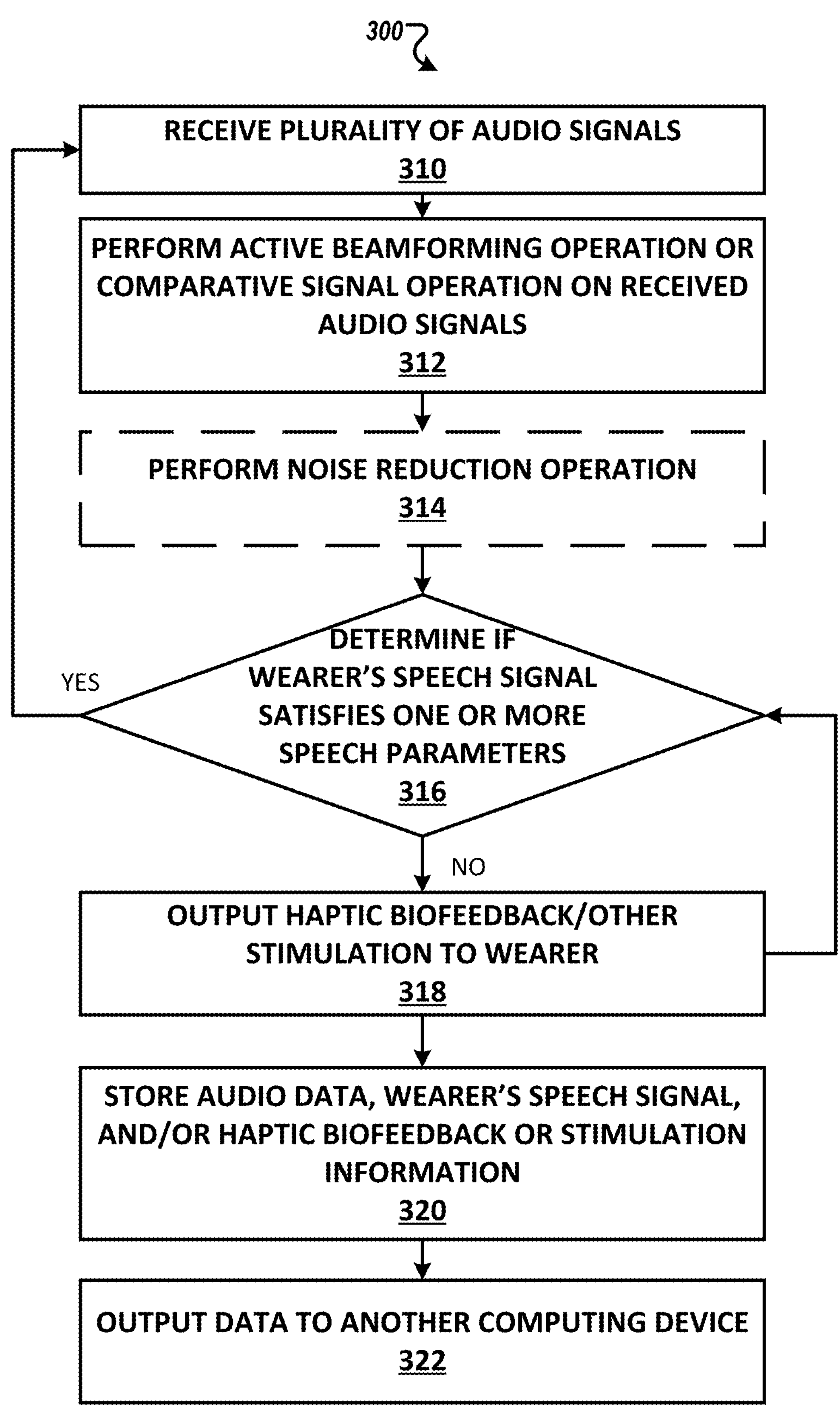
FIG. 3A is a flowchart of an example method for monitoring a user's speech and providing appropriate stimulation in accordance with certain embodiments described herein.

FIG. 3A is a flowchart of an example method 300 for monitoring a user's speech and providing appropriate stimulation in response to determining that certain speech parameters are not satisfied. In some implementations, the method 300 can be at least partially performed using the system 100 described in connection with FIG. 1. Additionally, and or alternatively, the method 300 can be at least partially performed by a processing circuitry (for example, but not limited to, an application-specific integrated circuit (ASIC), or a central processing unit (CPU)). In some examples, the processing circuitry may be electrically coupled to and/or in electronic communication with other circuitries of an example computing device. In some examples, embodiments may take the form of a computer program product on a non-transitory computer-readable storage medium storing computer-readable program instruction (e.g., computer software).

At step 310, the method 300 includes receiving an audio signal, for example, via a plurality of acoustic sensors.

At step 312, the method 300 includes performing an active beamforming operation and/or comparative signal operation on the received audio signals to determine whether the audio signals originated from the wearer. For example, the method 300 can include determining whether the received audio signals originated from the wearer. The method 300 can include rejecting the audio signals in response to determining that the audio signals originates from a non-wearer or another source. In some implementations, the method 300 includes isolating the wearer's speech signal based on a determined difference between respective energy amounts from different acoustic sensors (e.g., first acoustic sensor, second acoustic sensor, and/or at least a third acoustic sensor).

Optionally, at step 314, the method 300 includes performing a noise reduction operation on the received audio signals to further improve the quality of the wearer's speech signal.

At step 316, the method 300 includes determining whether the wearer's speech signal satisfies one or more speech parameters, including at least one of an acoustic intensity parameter or a speech rate parameter. In some implementations, the method 300 includes determining whether the wearer's speech signal satisfies an acoustic intensity parameter or speech rate parameter based on an amount of energy in the wearer's speech signal. By way of example, the at least one threshold for the acoustic intensity parameter can include a low acoustic intensity level and a high acoustic intensity level. Similarly, the at least one predetermined threshold for the speech rate parameter can include a low speech rate level and a high speech rate level.

At step 318, in response to detecting that the wearer's speech signal fails to satisfy at least one of the speech parameters, the method 300 includes outputting haptic biofeedback and/or other stimulation (e.g., audio, visual) to the wearer. As illustrated, the method 300 includes continuously monitoring the wearer's speech signal to determine whether the wearer's speech signal satisfies one or more speech parameters. Subsequently, in response to detecting that the wearer's speech signal satisfies at least one predetermined threshold associated with a respective speech parameter, the method 300 includes stopping the haptic biofeedback or other feedback/stimulation provided to the wearer. In some implementations, the example system or device is configured to monitor a wearer without providing any real-time feedback, for example, to inform a clinician's therapeutic plan for the wearer. In some implementations, the wearer or clinician can temporarily disable any feedback mechanism for a certain period of time (e.g., two hours, one day) using a switch/button on the device or through an App executing on a computing device.

At step 320, the method 300 includes recording and/or storing at least a portion of the audio data, the wearer's speech signal, and/or feedback data or stimulation information.

At step 322, the method 300 includes outputting at least a portion of the recorded/stored data to another computing device for analysis or display.

Figure 3B:
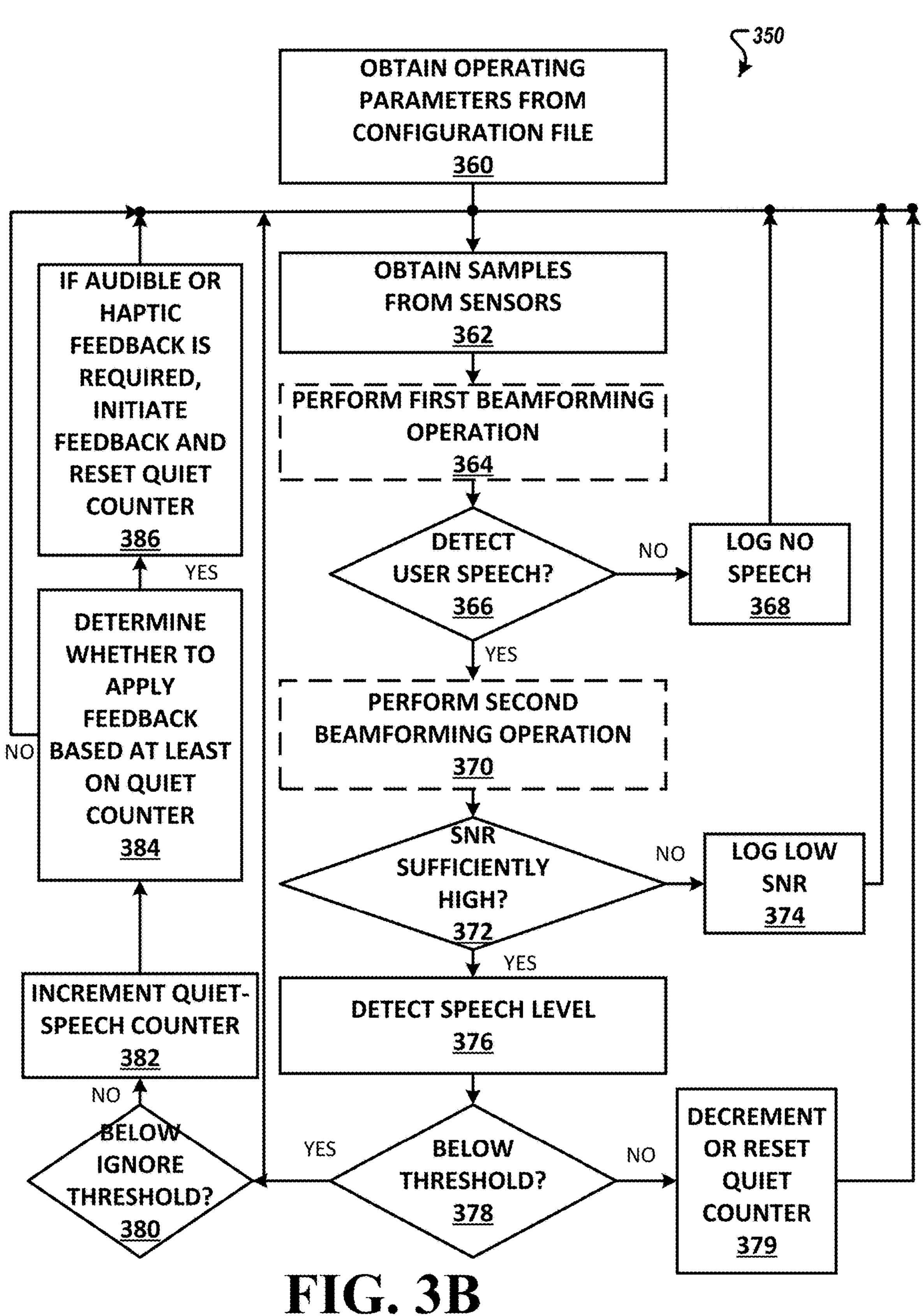
FIG. 3B is a flowchart of an example method in accordance with certain embodiments described herein.

FIG. 3B is a flowchart of an example method 350, as a detailed implementation of the example method of FIG. 3A, in accordance with certain embodiments described herein. FIG. 3B shows the method in relation to a beamforming operation. Herein, "beamforming" refers to spatial filtering signal processing operation to determine directional signal transmission or reception.

During the method 350, audio samples and possibly other sensor samples are obtained and analyzed to determine whether the user's speech meets certain criteria. Then, intermittent feedback may be given to the user when the speech is determined to not meet the criteria.

At step 360, the wearable speech-assisting device (e.g., SAMMS device) loads a configuration from memory, for example, a configuration file stored on a microSD card. This configuration contains operating parameters, including thresholds used in operation as described below, sensor calibration information, and feedback settings.

Next, at step 362, a frame of audio samples is obtained for each acoustic sensor (e.g., microphone) and also for the skin vibration sensor, if used.

At step 364, the method 350 includes performing a first beamforming and/or noise removal operation. For example, the method 350 can include removing background noise to some degree from the acquired speech signals by the use of, for example, two front microphones (one on each side of the head as shown in the first configuration 220*a* shown in FIG. 2B) or by the use of three microphones in a near-field beamforming system as illustrated in the third configuration shown in FIG. 2B. For example, in one embodiment, the two front microphones are calibrated so that their phase and magnitude responses are the same or nearly so. Then, the two microphone signals. $m_1$ and $m_2$, are combined to form a sum signal, s, and a difference signal, d. The sum signal will contain the speech, which arrives at the same time at both microphones, while the difference signal contains background noise with the speech signal canceled. An adaptive filter such as the least-mean-squares (LMS) adaptive filter can be applied to the difference signal, d. The output of the filter may be subtracted from the sum signal, s, and the adaptive filter may be continually adjusted to minimize this result of the subtraction, which may be the speech signal with the noise canceled therefrom.

The enhanced output signal can be analyzed for intensity for purposes of determining the user's speech level. Alternatively, when it has been determined that the user is speaking and the background noise level is below some threshold, then the signal from a single front microphone may be used for determining the user's speech level. The background noise can be determined to be below some threshold by monitoring the energy of the microphone signal level just prior to the detected speech. Alternatively, the speech detection threshold may be adjusted so that it only detects speech when the background noise is sufficiently below the speech level using the equation above.

In any of these situations, the system may be adjusted to use average signal amplitude instead of energy. Speech detection may also be performed using signal-to-noise ratio (SNR) or changes in SNR.

At step 366, the wearable speech-assisting device determines whether a user is speaking by comparing the strength of the signal in a front microphone to the strength of the signal in a rear microphone. Details of this sensor configuration are shown in the second configuration 220*b* shown in FIG. 2B. The user's speech may alternatively be detected by monitoring a skin vibration sensor. Such a sensor is less prone to acoustic noise than a microphone signal. By further correlating the skin vibration sensor signal with a front microphone signal, it is often possible to improve the accuracy of speech/voice detection. A higher correlation coefficient is indicative of more certainty that the skin vibrations are associated with a user's speech.

At step 368, if it is determined that no speech is present, then this is noted for later use in controlling the intermittent feedback system. Additionally, the noise level is recorded and used for later determination of signal-to-noise energy. Finally, the system proceeds to wait for the next frame of audio samples at step 362.

At step 370, if speech is detected, then beamforming (e.g., a second beamforming and/or noise removal operation) may optionally be applied. This is not generally done if beamforming was applied earlier in step 364.

It is possible that sufficiently high background noise may prevent an accurate determination of speech level. While this is the case, the user feedback may be temporarily suspended. This will not pose a problem from a treatment point of view if the feedback is provided intermittently.

At step 372, the speech signal-to-noise ratio (SNR) is determined and evaluated. The noise level is determined using the recent noise levels recorded at step 368, and the speech level is determined from the energy in the current signal. Since the current signal likely contains background noise as well as speech, the ratio of the two signal energies ($E_N$ and $E_x$) can be evaluated as $E_x/E_N=(E_s+E_N)/E_N=SNR+1$. The SNR may then be compared against a threshold to determine if the SNR is too low to permit an accurate assessment of speech level. In such instance, the frame is ignored at step 374.

At step 376, speech level is detected in any of multiple convenient ways, including calculating the energy in a segment of the signal or by calculating the energy in a frequency weighted or filtered signal.

Figures 3C, 3D:
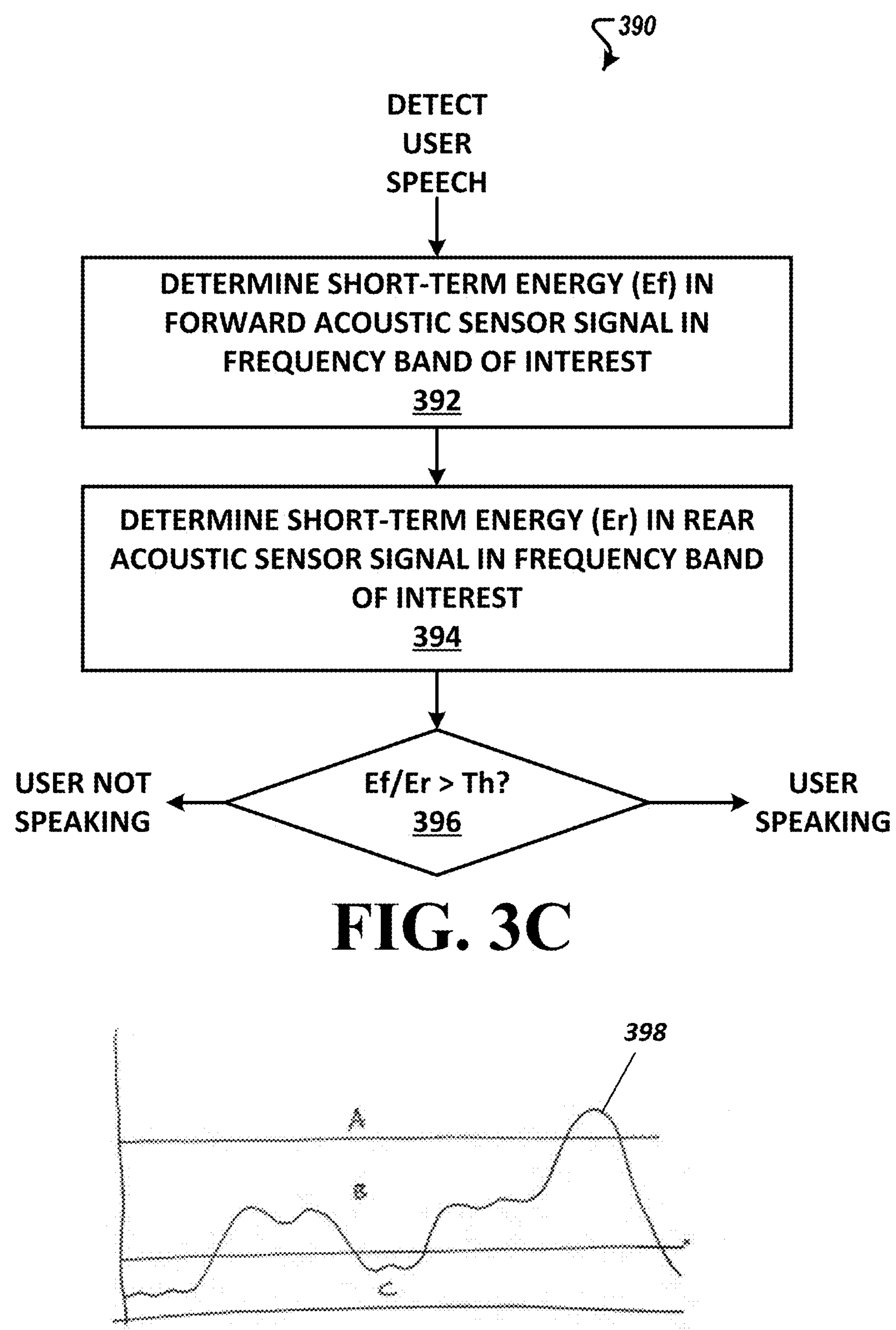
FIG. 3C is a flowchart of another example method in accordance with certain embodiments described herein.
FIG. 3D is a graph illustrating a wearer's speech signal as a function of time.

Steps 378, 379, 380, 382, and 384 may be understood in the context of the graph shown in FIG. 3D and the following explanation. In speech, vowels generally have more energy than consonants, and the level can vary continually during a speech utterance. Thus, while one operation of the wearable speech-assisting device is to provide feedback when a user is speaking too quietly, the determination that the speech is too quiet cannot be made at all times since it is expected and normal for some speech sounds to be quiet (for example, a "t" sound is naturally much quieter than an "ah" sound). Thus, when speech energy is below a certain low level, it is simply ignored as it is likely associated with low-energy consonants or background noise. Referring to FIG. 3D, the wavy line (398) represents speech signal short-term energy as a function of time. In this plot, the speech begins in region C and is ignored. In region B, the speech is exhibiting increased energy, likely associated with a vowel sound, but it has not reached the target threshold. If the speech energy stays in region B for too long, or if it goes to region B too often without reaching the target threshold, then feedback is given to the user to encourage them to speak more loudly. The determination of "too long" can be accomplished by having a "Quiet Counter" that counts up when in region B. This counter is used when determining whether to turn on the intermittent feedback. When the speech signal reaches region A, above the target threshold, then the Quiet Counter is reset. In region C, the Quiet Counter behavior may be set to slowly decrease the count, slowly increase the count, or to leave the Quiet Counter unchanged.

Returning to FIG. 3B, at step 378, the method 350 includes checking the speech level against the target threshold. If the speech energy is above the threshold, then the Quiet Counter is either decremented or reset at step 379 and the system proceeds to wait for the next frame of audio samples at step 362. If the speech level is below the target threshold, then the speech must be in either region B or region C. The determination is made in step 380. If the signal is in region C (i.e., the speech level is below the "Ignore" threshold), then the quiet counter is optionally modified as discussed above, and then the system proceeds to wait for the next frame of audio samples at step 362.

If the speech level is in region B, then the method 350 proceeds to step 380 and the Quiet Counter is incremented at step 382. Based at least on the Quiet Counter, the system can choose to initiate audible or haptic feedback at step 384. If feedback is initiated at step 386, the Quiet Counter is reset. The system proceeds to wait for the next frame of audio samples at step 362. The feedback may operate with a timer to allow it to continue for a set amount of time before turning off.

Referring to FIG. 3C, a flowchart showing a method 390 for detecting directionality of user speech using comparative operation based on energy in accordance with certain implementations described herein is shown. FIG. 3C may be performed as an alternative to the beamforming operation (e.g., 364, 370) described in FIG. 3B.

In some implementations, at step 392 and step 394, the system monitors the short-term energy of the front and rear microphone signals, respectively. Since the energy in an acoustic signal decreases as a function of $1/r^2$ where r is the distance from the source, the energy of the signal received by the rear microphone will be less than the energy from the front microphone when the source is the user's mouth. The energy from the user's speech at the front microphone will be $$\beta/r_1^2$$

where β is some value dependent on the source and $r_1$ is the distance from the mouth when a person is speaking. The energy from the user's speech at the rear microphone will be $$\beta/r_2^2$$

where $r_2$ is the distance from the mouth to the rear microphone. The difference between the observed energies in dB will be $$10\log_{10}E_f/E_r = 10\log_{10}\left(\frac{\beta/r_1^2}{\beta/r_2^2}\right) = 20\log_{10}(r_1) - 20\log_{10}(r_2)$$

On the other hand, more distant sources or sources that are closer to the rear microphone or approximately equidistant to the front and rear microphones will result in the energy of the two microphone signals being similar or even (e.g., for sources behind the user) higher in the rear microphone than in the front microphone.

Thus, at step 396, the method 390 includes determining if the user is speaking by monitoring the short-term energy of the front and back microphones and comparing the difference (in decibels) to a threshold. If the front microphone energy exceeds the rear microphone energy by more than the threshold, it is assumed that the user is speaking. Since there may also be other acoustic signals present (such as background or environment noise or another talker), the difference between the two signal energies may be approximated as $$10\log_{10}\left(\frac{N+\beta/r_1^2}{N+\beta/r_2^2}\right) < 20\log_{10}(r_1) - 20\log_{10}(r_2)$$

where N is the far-field noise. Because of this, it is often desirable to set the threshold lower. The actual threshold depends on the two distances and the amount of expected background noise but is often a few dB. In order to ensure that the ratio of energies does not blow up, a constant may be added to the denominator (containing $E_r$).

It should be appreciated that embodiments of the present disclosure can apply to various speech and voice disorders and are not limited to Parkinson's disease. For example, in one implementation, the system can be configured to train a user to limit their vocal effort to avoid straining their voice. In this case, the operation of the device can be modified to alert the user when the voice is consistently above a target threshold rather than below a threshold.

In another embodiment, the amount of speech and duration are monitored. In this case, the speech detection operates as described above in relation to FIG. 3C, but the number and duration of utterances are logged. This can be accomplished by counting the number of audio frames in which speech is detected sequentially or with only short dropouts; and also by tracking the number of times sequential speech frames are detected. In this case, it may be desirable to forego the haptic or audible feedback when used only for diagnostic purposes.

Certain speech disorders can also be detected using embodiments of the present disclosure. For example, mumbling may be detected by detecting consistent low levels of speech and optionally incorporating monitoring of speech rate. Additionally, this disclosure contemplates that embodiments of the present disclosure can be used to facilitate therapy for other conditions and situations including, but not limited to, aging voice, other degenerative neurologic conditions, occupations which are at high risk of vocal abuse (e.g., teachers, restaurant workers, and the like).

Experimental Results and Additional Examples

A study was conducted to develop and evaluate the exemplary system and method comprising a low-profile headset device that can isolate, monitor, and analyze vocal output for time and loudness and provide haptic biofeedback in the form of vibration to the wearer when minimum threshold intensity targets are not met. The study tested the device in, at least, eight patients with PD during a 60-minute treatment session with a speech-language pathologist (SLP). Each session consisted of 30 minutes with and 30 minutes without SLP feedback on vocal intensity. Intensity change and time between cues to increase intensity were measured and analyzed for differences between baseline and each condition.

Example Prototype. An example prototype Speech Assisting Multi-Microphone System (SAMMS) was developed that included a headset configured for monitoring of a wearer's speech/voice to mitigate Parkinson-associated impairments. The headset sends feedback through haptic touch if the patient's utterances do not exceed pre-defined sound thresholds. The headset was wired to a belt pack that clips on the patient's waistband. The device was prototyped on a custom printed circuit board (PCB) with an ARM Cortex M4 CPU to process the incoming data and trigger the feedback. Two MEMS microphones and an accelerometer were used to determine if the user was speaking. This speech data was filtered to reduce environmental noise and then compared to the vocal sound pressure level thresholds.

Figure 4A:
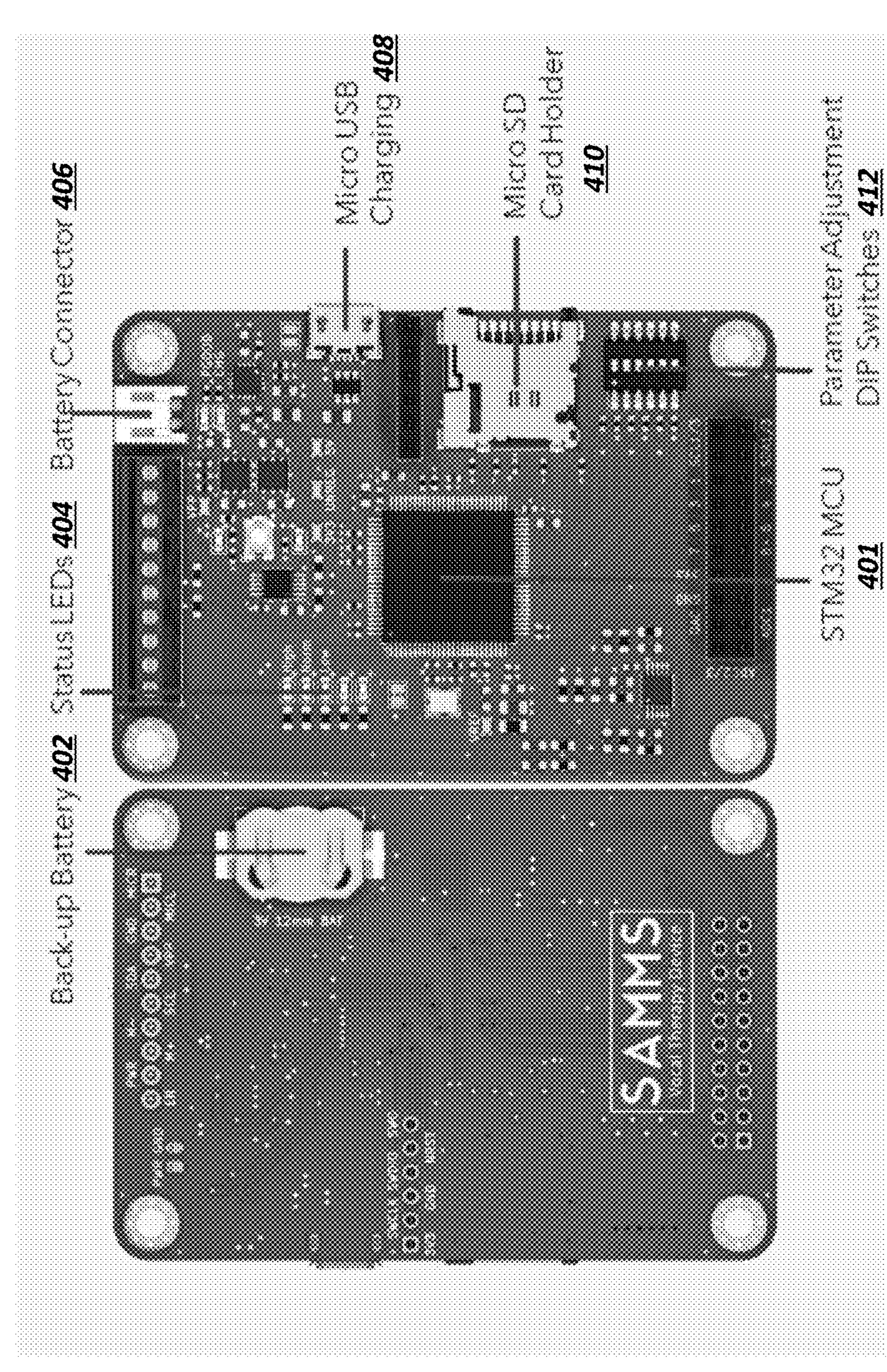
FIG. 4A shows an example custom printed circuit board (PCB) for a wearable speech-assisting device in accordance with certain embodiments described herein.

FIG. 4A shows an example custom PCB 400 for the wearable speech-assisting device (e.g., device 108). The PCB 400 included a high-performance, low-power microcontroller 401, a backup battery 402, status light emitting diodes (LEDs) 404, a battery connector 406, a micro-USB charging port 408, a micro-SD card holder 410, and parameter adjustment Dual In-Line package (DIP) switches 412. Careful attention was paid to the analog circuitry so noise and interference would be minimized.

The SAMMS's performance was assessed based on several criteria. First, the device should accurately detect voice levels in varying sonic environments. Secondly, the device should provide monitoring so that a therapist or patient can analyze the recorded data. Thirdly, the headset and associated gear (e.g., belt pack) should be practical for everyday use. That is, the device should be energy efficient and have a battery that should last throughout the day. The headset should be comfortable enough to be worn all day. The device's algorithms and components to be used in SAMMS, such as the microphone beamforming and bone-conduction microphones, should be based on reliable technology. The device should be economical.

The study designed and prototyped a head-mounted listening device that can monitor the amplitude and spectral density of the wearer's voice and compare it to a designated criterion. The device provided real-time haptic feedback when an amplitude threshold was not met, as well as recorded amplitude data to plot trends of the user's speech activity. The headset included two micro-electrical mechanical systems (MEMS) microphones and one accelerometer to monitor the user's voice even in high noise scenarios. All audio processing was conducted through an embedded digital signal processor (DSP) in a wired belt pack. The DSP analyzed the received signals from the microphones, reduced ambient noise, and compared the user's voice to their designated threshold. The prototyped device was less than $100.

This device was targeted towards speech therapy patients with vocal atrophy or patients placed on vocal rest. Vocally atrophied patients, such as Parkinson's patients, do not know when they are speaking inaudibly and require a reminder for them to speak above a certain threshold. Patients on vocal rest risk damaging their vocal cords by speaking above a given threshold. In both cases, the device monitors the user's voice and gives real-time haptic feedback to remind the user to follow their vocal routine as defined by their therapist.

Design requirements. The patient/user in the study wore SAMMS for an expected eight hours a day minimum to evaluate for size and weight considerations. The headset and belt pack were made to be light and well-fashioned to increase comfort and reduce fatigue. The study developed the system with power consumption consideration to ensure suitable battery life for the device that can constantly record and analyze data during the noted working day. A custom PCB with an ARM microprocessor works best since it consumes less energy than an entire development board.

Figures 4B, 4C:
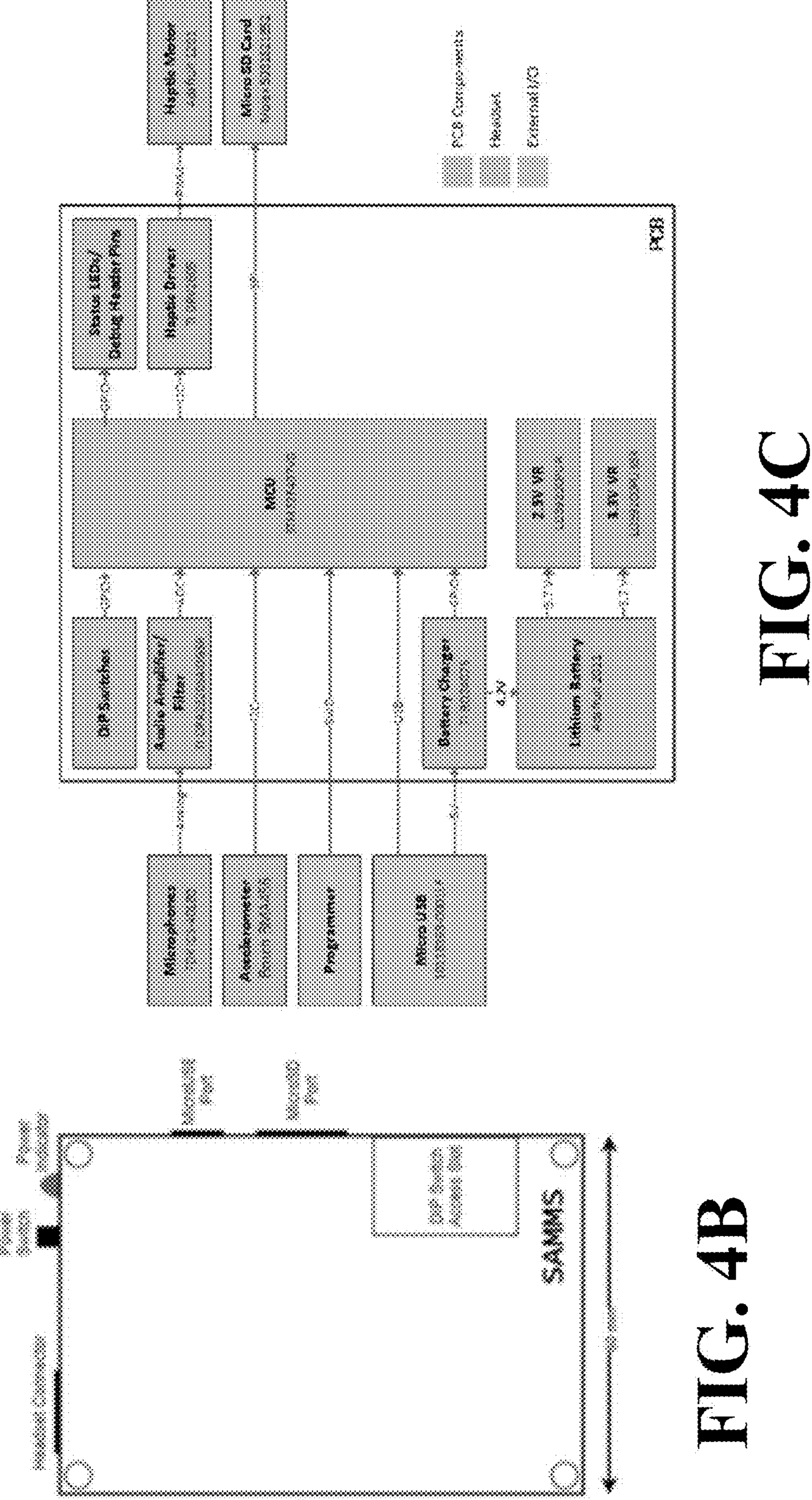
FIG. 4B is a schematic diagram showing an initial mockup of a prototype that was developed.
FIG. 4C is a schematic diagram depicting a high-level signal flow through the PCB.

Headset design considerations. The prototype device included two primary parts: a belt pack and a wired headset. The belt pack housed the custom PCB, battery, and any peripherals such as the micro-USB port and micro SD card. FIG. 4B is a schematic diagram showing an initial mockup of this unit, which was first estimated to be about 3.1"×2.3" (85×60 mm). A slide switch at the of the pack turns on and off the device and the device status is shown by an LED light. FIG. 2C shows the design of the SAMMS headset with the internals mounts.

FIG. 4C is a schematic diagram depicting a high-level signal flow through the PCB. Instead of using the DIP switches to set the speech thresholds for the patient as previously intended, the voice therapist will now set the threshold using the SD card.

The haptic driver included a Texas Instrument DRV2604 to control the haptic motor in the headset by pulse-width modulation (PWM). It received an I2C signal from the microcontroller and can generate various haptic patterns.

The study used a battery pack, Adafruit 2011, manufactured by Adafruit. It is a lithium-ion polymer battery that has a nominal output voltage of 3.7 V. This provides an acceptable voltage for the 3.3 V voltage regulator and adjustable headset voltage regulator. The total capacity is 2 amp-hours, which was determined to be sufficient to power the device for the noted requirements. The weight of the battery is 1.2 oz and has dimensions of 2.4"×1.4"×0.3". The cell could readily fit with the PCB in the belt-pack.

Figure 4D:
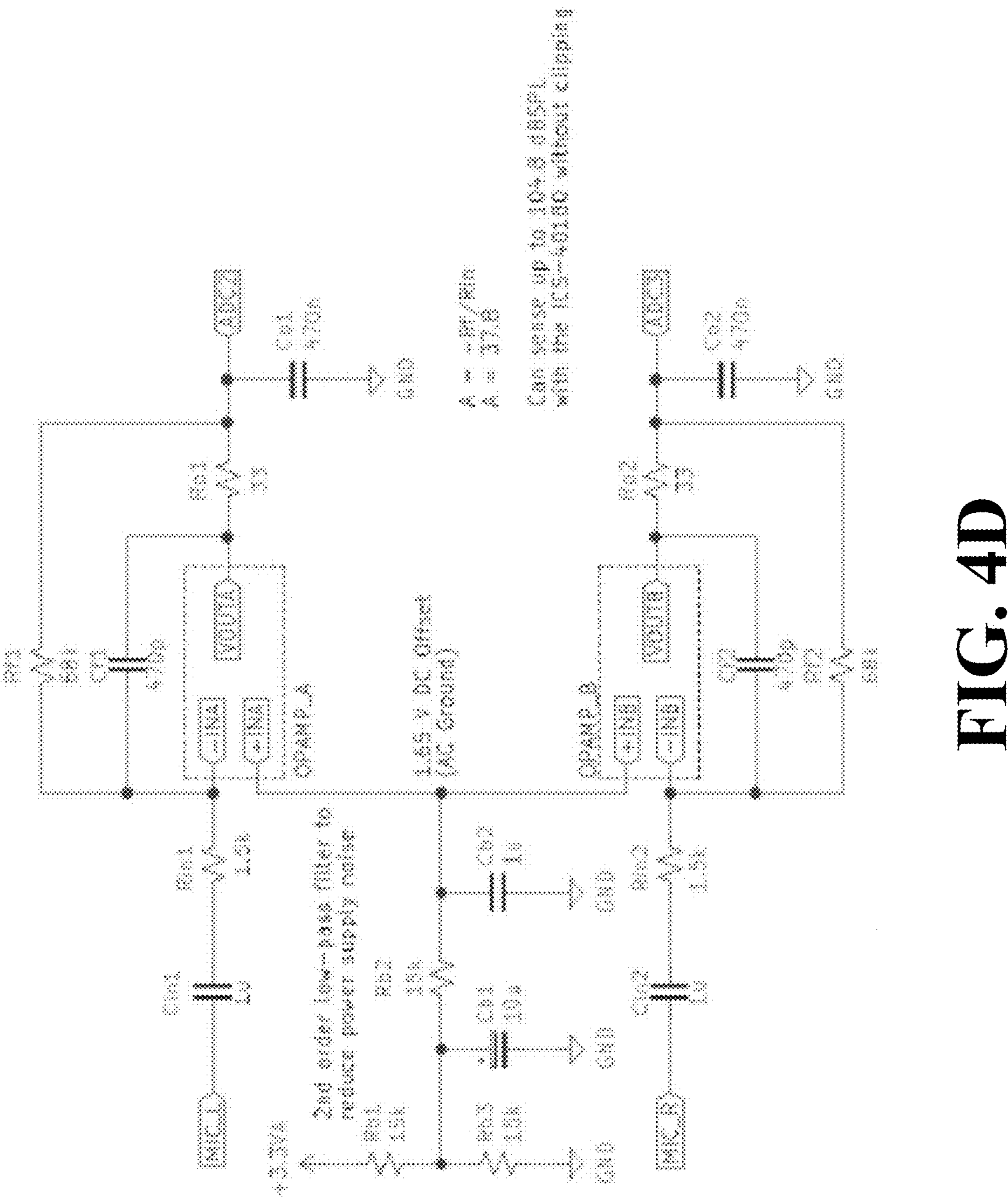
FIG. 4D is an electrical diagram showing a dual, inverting bandpass filter using a single-supply op-amp.

Headset Implementation. The headset included two ICS-40180 omnidirectional MEMS microphones manufactured by InvenSense (TDK) having a sensitivity of −38 dBV and operatable between 1.5 V to 3.6 V. One microphone measured 3.5×2.65×0.98 mm. The microphones connected to the microcontroller ADCs after passing through the op-amp filter/amplifier are shown in FIG. 4D. The filter produced a frequency response from 90 Hz-7 kHz. The range was observed to maintain the fidelity of the human voice with little intelligibility lost. The headset employs a second-order low pass filter (7 kHz) for aliasing.

The headset included an accelerometer, Bosch BMA456 digital comprising a triaxial acceleration sensor that operates between 1.6 V to 3.6 V with a nominal voltage supply of 2.4 V and outputs data on SPI and I2C standards. It has a 2×2×0.65 mm package [9].

The Adafruit haptic disc motor operated between 2V and 5V, with a larger voltage outputting a stronger vibration [10]. It will be connected through a diode to the motor driver to minimize reverse current and reduce any possible damage to the PCB.

Figure 4E:
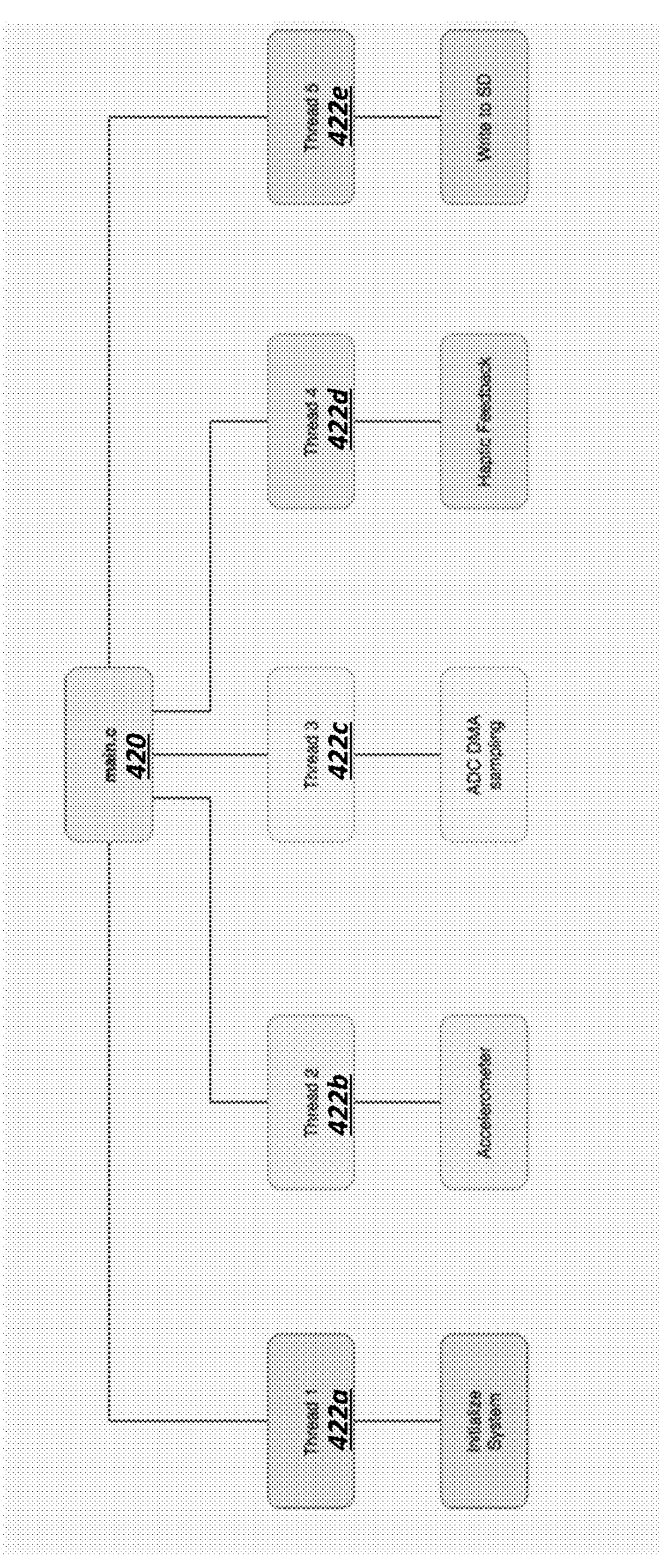
FIG. 4E provides an overview of the multi-threaded design in accordance with certain embodiments described herein.
Figure 4F:
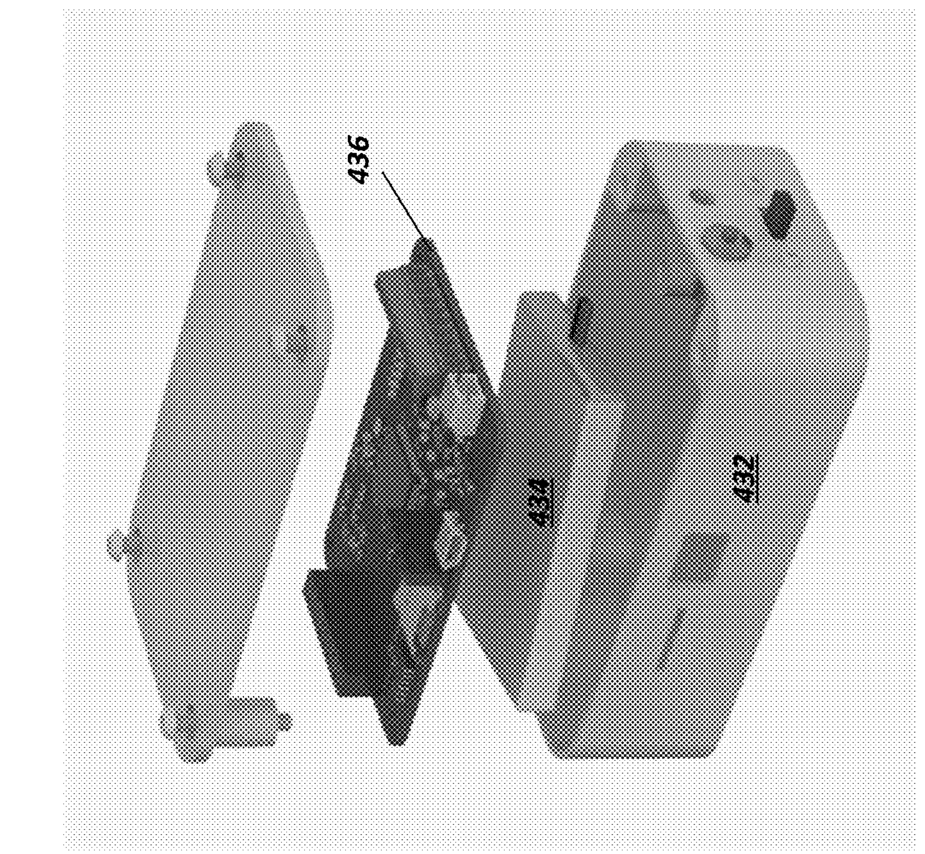
FIG. 4F shows an example belt pack in accordance with certain embodiments described herein.
Figure 4G:
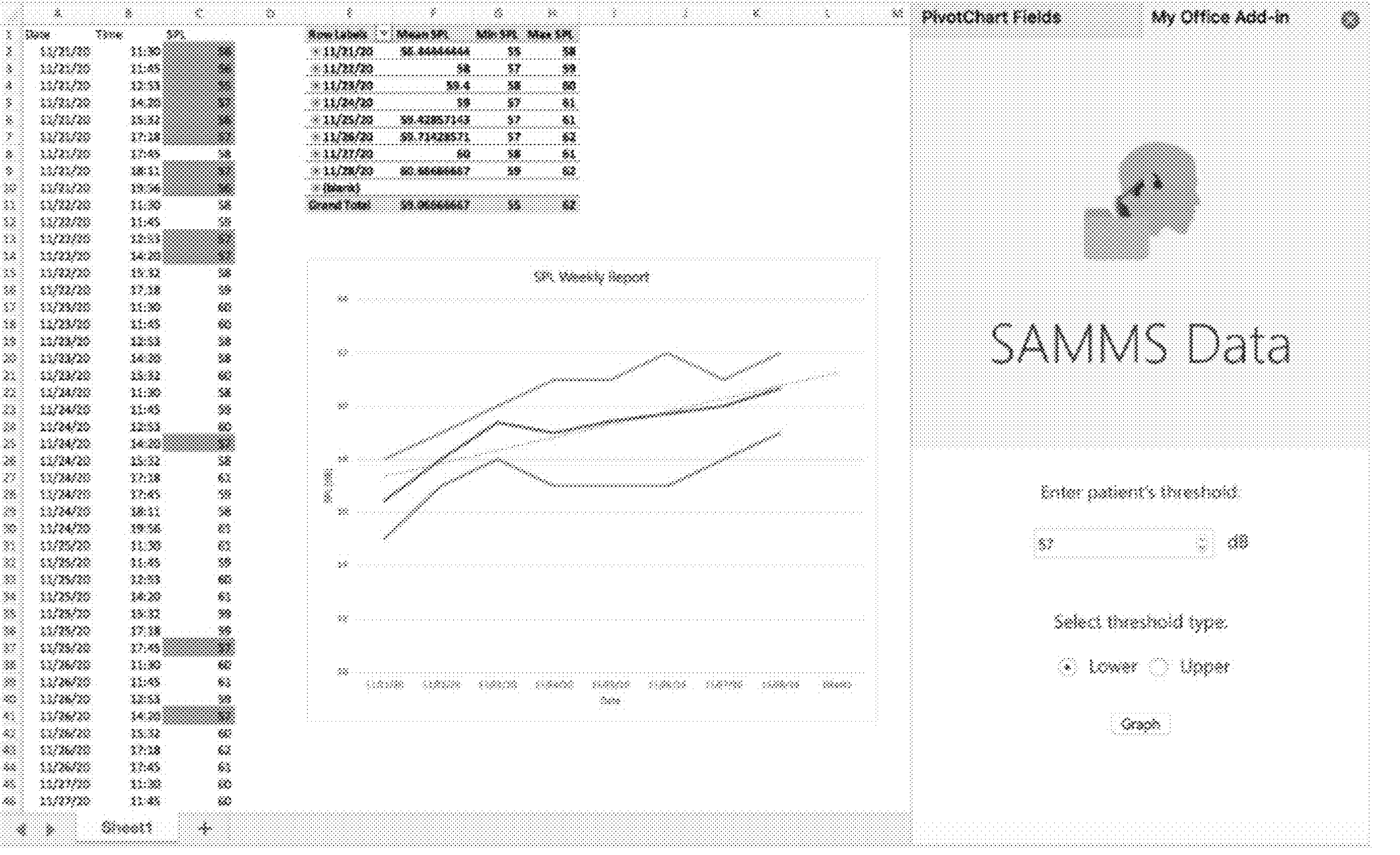
FIG. 4G depicts user interface data generated via the prototype device.

Therapist and Patient. The headset includes an SD card to store data (audio recording, monitored data associated with use). The SD card included two text files: one for the therapist to designate the threshold type and level and one to store the patient's SPL data over the course of each week. The therapist could type into the th.txt file whether the patient requires a lower or upper threshold and the SPL level of that threshold to which the microcontroller of the headset would read the data on start-up. The second text file (data.txt) was a 3-column list, separating with commas the date, time, and SPL level recorded. The therapist could load this data into Microsoft Excel using the Text Import Wizard. The data is comma delimited, and the wizard could separate the data into three columns. The study created a custom SAMMS Excel-Add-In, to which the user can type in the patient's threshold, select whether the threshold is lower or upper, and click the graph button to automatically create an Excel Pivot Chart with the mean, min, and max SPL for each day. An example graph of an example data is shown in FIG. 4G. The chart dynamically changes as the pivot chart is expanded and collapsed. The Add-in is configured to highlight certain data: any value that exceeds the SPL in the patient's data is highlighted in red, so it is easy to find on the spreadsheet.

Final Headset Design. The final headset design used (i) a lightweight elastic material on the C-band section that wraps around the head and (ii) soft resin-based material to provide a lightweight and ergonomic headset that exerted minimal pressure on the temples of the user. The wire harness from the microphones, accelerometer, and haptic motor was routed through the right side of the headset and wired to the belt pack. The wiring harness will be clipped around the C-band and drop down at the back of the head.

Belt-Pack. The PCB with components attached had dimensions of 90 mm length, 55 mm wide, and 40 mm height and was made of a thermoplastic material with both low thermal and electrically conductive properties.

One prototype featured six mount locations used for both the PCB and the cover. Six metallic screws and washers were going to be used to secure both lid and PCB. The prototype had a 1 mm wall thickness and measured 90 mm length×50 mm wide and 18 mm height. The wall thickness was sufficiently rigid to protect the PCB against outside impacts, vibrations, and temperatures necessary to keep the PCB components from normal daily utilization.

Printed Circuit Board. FIG. 4A shows the fabricated design of the mixed-signal PCB. The SAMMS PCB included a microcontroller, power management/battery charging, analog amplification/filtering, and device peripherals. For the microcontroller, 100 nF decoupling capacitors were placed on each power pin, and an additional 10 uF capacitor was placed near the IC.

The power regulation subsystem included a battery management IC, two voltage regulators, a potentiometer, and various discrete resistors, capacitors, and fuses. The battery management IC, a TI BQ24075, handled all the charging needs of the Li—Po battery and can perform fast charges, allowing the battery to charge with up to 500 mA (the max current able to come from the micro USB port). It can also activate two separate indicator LEDs to show when the battery is charging and if a valid power source is connected along with other useful data. After the battery manager, the unregulated power is split into two voltage regulators, one for the PCB components and the other exclusively for the headset. The voltage regulator for the PCB is preconfigured to a constant 3.3V. The headset regulator, on the other hand, is adjustable from 2.05-3.3 V with the small, one-turn potentiometer. This allowed for testing the headset with different voltages to find what would work best. Both the accelerometer and MEMS microphones are able to be powered from lower voltage supplies for low power consumption.

To amplify and filter the analog signals from the MEMS microphones, an inverting bandpass op-amp filter was designed as shown in FIG. 4D. This filter has a low-frequency cutoff of ~90 Hz with a 20 dB/decade drop off (1st order) and a high frequency cutoff of ~7 kHz with a 40 dB/decade drop off (2nd order). The second-order low pass filter helps to prevent any antialiasing from happening in the ADCs. The op-amp topology below also uses a single supply design-meaning the voltage rail of the op-amp goes from 3.3 V to ground (not-3.3 V). This requires a 1.65 V offset to be added to the input signal coming from the microphones. This is accomplished by using a filtered voltage divider. When designing an amplifier/filter, it is important to note that higher-value resistors will add more Johnson noise to the device. Therefore, it is critical to find the appropriate balance between low power and low noise. FIG. 4D is an electrical diagram showing a dual, inverting bandpass filter using a single-supply op-amp.

Digital Signal Processing. The SAMMS device samples audio data to calculate the user's current Sound Pressure Level value to determine if the user is within their prescribed threshold. The STM32F407 chip has three 12-bit Analog to Digital Converters (ADCs). For the application of SAMMS, only the first two ADCs are needed. Direct Memory Access (DMA) is used to stream the available data from the ADCs directly into a data buffer within the running program. The inclusion of the DMA stream allows for the sampling of data to occur without using any processing power. Once this buffer completely fills up, the DMA restarts writing samples at the zeroth index of the buffer. The Hardware Abstraction Layer (HAL) library included interrupt callback functions, which got called when the DMA finished both the first half of the buffer and the full buffer. The callback functions allow a separate flag to be set to tell the main sampling code which half of the buffer to process.

To trigger both ADC conversions at the exact same time, the study used the Dual Regular Simultaneous Mode which slaves ADC2 to ADC1 and returns the resulting two 12-bit values within a single 32-bit Common Conversion Register (CCR). ADC1 returned in bits 0-11, and ADC2 returned in bits 16-27 of the 32-bit register. The two ADC conversions occur based on an external trigger event, which was set up as a timer event. Timer 2 was configured to oscillate at 20 KHz and produced an output compare event, which is used as the trigger edge for ADC1. The DMA and ADC clock speeds were set to a high frequency (>1 MHZ) so that each sample at 20 kHz is converted as fast as possible to give a more precise bit value.

The microphone data is pulled out from the 32-bit CCR and split into the sum of the mic data and the difference between the mics. The sum and difference are the input and reference signal, respectively, and were fed into the nLMS filter for ambient noise cancellation. The output of the filter results in an approximation of the noise, and the error returned from the function results in the user's speech. This speech was then fed into a decimator, which functions as a lowpass and halves the number of samples to process.

To calculate the SPL value from the microphone data, the output of the decimator is put into an overlapping windowed RMS function. The RMS function calculates 4 overlapping RMS blocks from the input vector and adds the average to the final. When the thread containing the accelerometer stops sensing the user's speech, Timer 2 is paused, and the SPL value is calculated from RMS values previously calculated. This SPL value is written to the SD Card along with a time stamp, and then the values are reset during the next detection of user speech.

Software. The final SAMMS design used a multi-threaded structure having 5 threads. FIG. 4E provides an overview of the multi-threaded design. DSPeople developed this in the C language with FreeRTOS and the STM32 Cube IDE. The main thread 420 started the peripherals to collect voice amplitude data. Then, it launched the other 5 threads (Threads 422*a*-*e*). Thread 1 (422*a*) read the threshold SPL value from the SD card and Saves it for Thread 4 (422*d*) to use. Thread 2 (422*b*) controlled the accelerometer, sensed the user speaking, and triggered the ADCs in Thread 3 (422*c*). Thread 3 (422*c*) sampled voice amplitude data from ADCs and sends data to Thread 5 (422*e*). Thread 3 (422*c*) calculated SPL & saved it for Thread 4 (422*d*). Thread 4 (422*d*) triggered the haptic motor if the calculated SPL value falls below the threshold from Thread 1 (422*a*). Thread 5 (422*e*) wrote sampled voice amplitude data from Thread 3 (422*c*) to the SD card.

Belt-pack Fabrication. For ergonomic reasons, the belt pack was manufactured from a light-weight and flexible material. The belt-pack design was made initially as a computer-aided design (CAD) drawing, with dimensions primarily based on the PCB and battery dimensions. The belt pack also contains the LED light, switch, and cables going to the headset. On the side are two ports for a USB and an SD card. The original fabrication left minimal space to accommodate the wiring slack inside the belt pack. FIG. 4F shows an example belt pack that comprises a 3D printed housing 432 configured to receive a Li—Po battery 434 and PCB 436.

Headset Fabrication. The headset's initial design was a single piece 3D printed from ABS material. This product was lightweight but lacked flexibility and was brittle. The wire channels to route the cables were too small to feed the wires through to the back of the C-section. The second prototype was made of separate sections that were 3D printed and joined together. After fabrication the product was not durable and ergonomic. Because of the hardness and inelastic material, there was an uncomfortable amount of force applied to the temples that made it hard to wear for longer durations of time. The corrective action was to modify the headset by changing the material from an ABS to a flexible resin and using a separate springy material on the C-band section that goes around the back of the head. This modification would make the headset a one-size for different head sizes. Considering that the headset will be worn for 8 hours on average daily. The material used initially lacked enough flexibility on a band around the head and snapped if opened too wide.

PCB Fabrication. Each board was connected to the STM32F4 Discovery board to test serial communication and proper trace routing for each accessory component. The analog MEMS microphones were connected to generations of level-shifting amplifier circuits, which raised the low Power MEMS mics to a DC RMS voltage of 1.65V and scaled the output from 90 mVpp to 3.3 Vpp (assuming a max SPL of 105 dB). The output of the microphones and amplifier boards was verified through various scope captures and throughput audio through the STM32F4 Discovery board. The accelerometer and Haptic motor driver were I2C chips, and their prototype schematics were verified by I2C sniffers. T Project Demonstration Parameters. The study evaluated the device for wearability and in a variety of sonic environments, including in a quiet room with an average SPL of less than 40 dBA, a live room with an SPL of 50-60 dBA, and outdoors with an SPL>65 dBA. These different environments test the device's ability to suppress unwanted noise and detect the user's voice. The demonstration for the device in each of the scenarios included (i) setting the low speaking threshold to normal speaking volumes (approximately 57 dB (A) at 1 meter); placing the headset comfortably around their cars, and attaching the belt-pack to their shorts/pants; turning on the device; asking the user to speak softly/whisper until a haptic response is felt to speak up; asking the user to subsequently speak at a normal volume for one minute with no other person speaking nearby (there should be no haptic feedback); for another minute, asking the user to engage in a brief conversation with a person, who is about one meter away (again, there should be no haptic feedback felt); and, after the three environmental scenarios are demonstrated, removing the SD card containing the voice data from the speaking assistant to review a summary of voice usage.

Lower Speaking Thresholds: The study evaluated the headset operation. An oscilloscope was connected to a GPIO pin on the STM32 to confirm when the thresholds are triggered, and an SPL meter will be used to verify the volume of the voice in a quiet room. An LED on the belt pack will also turn on when a threshold is met.

Microphone/Accelerometer Responses: The study evaluated the responses of the two MEMS microphones and the bone-conduction accelerometer using a dynamic signal analyzer (DSA) and oscilloscope.

Experimental Results: There were no significant differences (p=0.25) in time between cues to increase intensity in the SLP-assisted condition compared to the device condition. There was no significant difference in change in vocal intensity in decibels between the SLP assisted condition and the device-assisted condition (p=0.66). When groups were split by disease severity, those with mild to moderate PD required significantly fewer intensity cues and increased vocal intensity significantly more than those with severe PD for both the SLP and device-assisted conditions (p<. 001).

Discussion: Patients with mild to moderate PD respond positively to the haptic feedback provided by an individually calibrated low-profile headset. This technology may serve as a helpful adjunct to standard-of-care voice therapy.

DISCUSSION

Parkinson's disease (PD) severely impacts verbal communication in 70-90% of patients. Many people with PD have hypokinetic dysarthria, characterized by a soft and weak voice, reduced pitch and loudness variation, and reduced articulatory precision-affecting intelligibility. This change is often obscured to the individual, secondary to disease-associated neurological degradation causing disruptions to the sensorineural feedback loop. Behavioral voice therapy, the gold standard treatment for Parkinson's-related communication disorders, requires an intensive schedule of four-times-weekly sessions for four weeks along with daily, accurate, home practice. Despite such time commitment, the rate of symptom relapse following treatment is high. Further, the feedback disruption does not respond to primary pharmaceutical and surgical methods for treating axial changes observed in PD, putting this population at risk for social isolation, and impaired involvement in communicative activities of daily living with mental health and safety implications.

The long-term goal of our team's research is to effectively reduce communication disorders in patients with PD. The objective of this application is to further refine and validate wearable personal technology that provides real-time feedback to address the most salient communication deficit in people with PD-reduced vocal loudness. Our central hypothesis is that patients with PD will accept and benefit from a low-profile wearable device that monitors vocal loudness and provides real-time haptic feedback to reduce the burden of PD-related hypophonia. Our hypothesis and research plans are based on our team's successful creation of a second generation Speech-Assisting Multi-Microphone System (SAMMS) device (2021 McCamish Blue Sky Seed Grant recipient). In its current version, the device can monitor vocal intensity in decibels, supply real-time data display and biofeedback, and has enhanced form factor for comfort. Currently in the final three months of initial seed funding, our team is validating the device with patient and caregiver input for ecological validity and clinical feasibility. The goal of this next phase is to test the usability and conduct a feasibility trial of prolonged extra-clinical use of the SAMMS device in a cohort of patients with PD.

Additional Discussion. There are existing devices for vocal dose monitoring: the VocaLog2, the VoxLog, and the Ambulatory Phonation Monitor (APM). The VocaLog2 consists of a microphone placed directly against the user's throat to monitor sound pressure level (SPL) and a belt-pack to provide vibrotactile feedback [1]. VoxLog uses both an accelerometer and an Air microphone, while APM solely relies on an accelerometer [2]. These latter two devices measure both SPL and the fundamental frequency (F0) of the patient's speech to derive additional measurements relating to vocal dose [3]. Separate minimum and maximum phonation thresholds can be set for hypophonia and hyperphonia patients, respectively. All products have an adjustable threshold for environmental noise. Each device must be connected to a computer for analysis of vocal trends and vocal compliance. By lacking a direct view of the collected vocal data, these devices are limited to monthly progress reports dictated by speech therapy appointment. Cheaper approaches exist in the form of cellphone apps. The Sonneta Voice monitor provides realtime measurements and displays of both SPL and F0 but cannot passively monitor vocal changes throughout the day [4].

Example Computing Device

Figure 5:
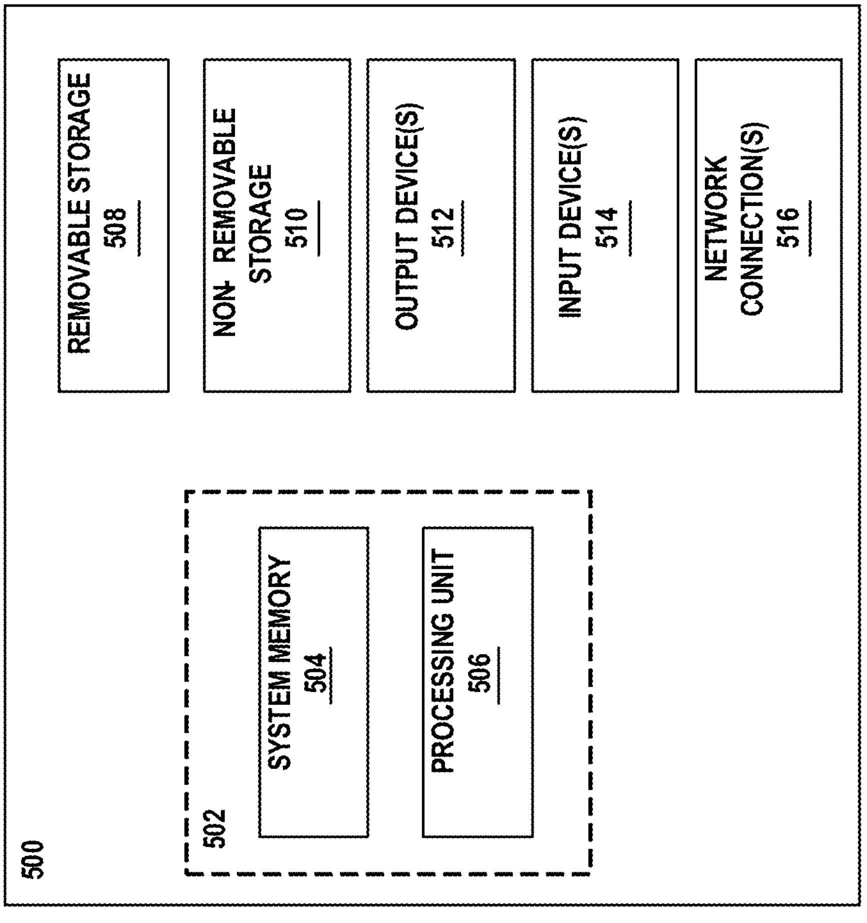
FIG. 5 is an example computing device.

Referring to FIG. 5, an example computing device 500 upon which the methods described herein may be implemented is illustrated. It should be understood that the example computing device 500 is only one example of a suitable computing environment upon which the methods described herein may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for the operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510, including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512, such as a display, speakers, printer, etc., may also be included. The additional devices may be connected to the bus in order to facilitate the communication of data among the components of the computing device 500. All these devices are well-known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example of tangible, computer-readable media may include, but is not limited to, volatile media, non-volatile media, removable media, and non-removable media implemented in any method or technology for storage of information such as computer-readable instructions, data structures, program modules or other data. System memory 504, removable storage 508, and non-removable storage 510 are all examples of tangible, computer storage media. Examples of tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

CONCLUSION

Various sizes and dimensions provided herein are merely examples. Other dimensions may be employed.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications, as listed below and throughout this document, describes various application and systems that could be used in combination the exemplary system and are hereby incorporated by reference in their entirety herein.

[1] "Instruction Manual for VocaLog 2TM Vocal Activity Monitor," VocaLog.com. [Online]. Available: http://www.vocalog.com/VL2_Help/VocaLog2_Help.html. [Accessed: 12 Apr. 2020].

[2] A. Nacci, B. Fattori, V. Mancini, E. Panicucci, F. Ursino, F. M. Cartaino, S. Berrettini, "The use and role of the Ambulatory Phonation Monitor (APM) in voice assessment," Acta Otorhinolaryngologica Italica, vol. 33, pp. 49-55, 2013.

[3] J. V. Stan, J. Gustafsson, E. Schalling, R. E. Hillman, "Direct Comparison of Three Commercially Available Devices for Voice Ambulatory Monitoring and Biofeedback," Perspectives on Voice and Voice Disorders, vol. 24, no. 2, July, pp. 80-86, 2014.

[4] "Sonneta Voice Monitor," Soft112.com. [Online]. Available: https://sonneta-voice-monitorios. soft112.com/. [Accessed: 12 Apr. 2020].

[5] UI Devices, "MEMS Microphone," CMM-2718AT-42108 datasheet, January 2020. [Online]. Available: https://www.cuidevices.com/product/resource/emm-2718at-42108-tr.pdf [Accessed: 15 Apr. 2020].

[6] Bosch, "Digital, Triaxial Acceleration sensor," BMA280 datasheet, August 2019. [Online]. Available: https://ae-bst.resource.bosch.com/media/_tech/media/datasheets/BST-BMA280-DS000.pdf [Accessed: 15 Apr. 2020].

[7] Digikey, "Vibrating Mini Motor Disc," 1201 Motor datasheet, July 2015. [Online]. Available: https://media-.digikey.com/pdf/Data % 20Sheets/Adafruit %20PDFs/1201_Web.pdf [Accessed: 15 Apr. 2020].

[8] "ISO 13485:2016 Medical devices-Quality management systems-Requirements for regulatory purposes," ISO, 21 Jan. 2020. [Online]. Available: https://www.iso.org/standard/59752.html. [Accessed: 9 Apr. 2020].

[9] "ISO/IEC 9899:2018 Information technology-Programming languages-C," ISO, 5 Jul. 2018. [Online]. Available: https://www.iso.org/standard/74528.html. [Accessed: 9 Apr. 2020].

[10] "ISO 10993-1:2018," ISO Biological evaluation of medical devices—Part 1: Evaluation and testing within a risk management process, 1 Nov. 2018. [Online]. Available: https://www.iso.org/standard/68936.html. [Accessed: 14 Apr. 2020].

[11] "ISO/IEEE 11073-20702:2018 Health informatics-Point-of-care medical device communication—Part 20702: Medical devices communication profile for web services," ISO, 28 Aug. 2018. [Online]. Available: https://www.iso.org/standard/74703.html. [Accessed: 9 Apr. 2020].

[12] "ANSI/AAMI ES60601-1:2005/(R) 2012 Medical electrical equipment—Part 1: General requirements for basic safety and essential performance," AAMI, 2013.

[13] B. L., "H.R.4040-110th Congress (2007-2008): Consumer Product Safety Improvement Act of 2008," Congress.gov, 14 Aug. 2008. [Online]. Available: https://www.congress.gov/bill/| 10th-congress/house-bill/4040. [Accessed: 15 Apr. 2020].

[14] M. Stralin, "Classification Of Medical Devices And Their Routes To CE Marking," CE Check Support-Product and CE marking information, February 2020. [Online]. Available: https://support.ce-check.eu/hc/en-us/articles/360008712879-Classification-Of-Medical-Devices-And-Their-Routes-To-CE-Marking. [Accessed: 15 Apr. 2020].

[15] "RoHS Guide," 2020 RoHS Compliance Guide: Regulations, 10 Substances, Exemptions. [Online]. Available: https://www.rohsguide.com/. [Accessed: 14 Apr. 2020].

[16] "Electrical Engineer| Salary in Atlanta, GA," salary-.com, 2020. [Online]. Available: https://www.salary.com/research/salary/benchmark/electrical-engineer-i-salary/atlanta-ga. [Accessed 15 Apr. 2020]. SAMMS by DSPeople 45

[17] Gemma Moya-Gale and Erika S Levy, "Parkinson's disease-associated dysarthria: prevalence, impact and management strategies," Dovepress: Research and Reviews in Parkinsonism. May 2019. [Abstract]. Available: https://www.dovepress.com/[Accessed 13-April-2020].

What is claimed is:

1. A wearable speech-assisting device comprising:

a plurality of acoustic sensors to be placed on a wearer, including a first acoustic sensor and a second acoustic sensor; and one or more feedback elements;

a processor operatively coupled to the plurality of acoustic sensors and the one or more feedback elements, the processor being configured to:

receive a plurality of audio signals via the plurality of acoustic sensors, including at least a first audio signal from the first acoustic sensor and a second audio signal from the second acoustic sensor;

perform an active beamforming operation or comparative signal operation on the received audio signals to determine whether the received audio signals originated from the wearer and/or reject the audio signals in response to determining that the audio signals originate from another source;

responsive to determining that the received audio signals originated from the wearer, isolate the wearer's speech signal based on a determined difference between respective energy amounts from the first acoustic sensor and the second acoustic sensor;

determine whether the wearer's speech signal satisfies one or more speech parameters; and in response to detecting that the wearer's speech signal fails to satisfy at least one predetermined threshold of at least one speech parameter for a specified time period, output feedback to the wearer via the one or more feedback elements.

2. The wearable speech-assisting device of claim 1, wherein the one or more speech parameters includes at least one of an acoustic intensity parameter, a speech rate parameter, pitch, speech duration, voice quality, or response time.

3. The wearable speech-assisting device of claim 1, wherein at least one of the feedback elements comprises at least one haptic biofeedback element, and wherein the processor is further configured to output haptic biofeedback via the at least one haptic biofeedback element.

4. The wearable speech-assisting device of claim 3, wherein the processor is further configured to:

in response to detecting that the wearer's speech signal satisfies the at least one predetermined threshold, stop providing the haptic biofeedback to the wearer.

5. The wearable speech-assisting device of claim 1, wherein the processor is further configured to:

perform a noise reduction operation on the received audio signals.

6. The wearable speech-assisting device of claim 1, wherein the first acoustic sensor is positioned in closer proximity to the wearer's mouth than the second acoustic sensor and the device is configured to detect the wearer's speech signal based on at least the first and second acoustic sensors, and wherein two or more of the plurality of acoustic sensors form an acoustic array that is used to isolate the wearer's speech signal.

7. The wearable speech-assisting device of claim 1, wherein the second acoustic sensor is positioned on a wearer's head or upper body, and wherein the first acoustic sensor is positioned on a wearer's head or upper body in closer proximity to the wearer's mouth than the second acoustic sensor.

8. The wearable speech-assisting device of claim 1, wherein the processor is further configured to:

isolate the wearer's speech signal based on a determined difference between respective energy amounts from the first acoustic sensor, the second acoustic sensor, and/or at least a third acoustic sensor.

9. The wearable speech-assisting device of claim 8, wherein the third acoustic sensor is positioned on a first side of the wearer's head or upper body.

10. The wearable speech-assisting device of claim 8, wherein the first acoustic sensor and the third acoustic sensor are positioned on opposite sides of the wearer's head or upper body in a beamforming configuration.

11. The wearable speech-assisting device of claim 1, wherein the wearable speech-assisting device is operatively coupled to a beamformer that is configured to assess an acoustic power level in a direction of the wearer's face.

12. The wearable speech-assisting device of claim 1, wherein the processor is further configured to:

determine whether the wearer's speech signal satisfies an acoustic intensity parameter or speech rate parameter based on an amount of energy in the wearer's speech signal.

13. The wearable speech-assisting device of claim 12, wherein the at least one predetermined threshold for the acoustic intensity parameter comprises a low acoustic intensity level and a high acoustic intensity level, and wherein the at least one predetermined threshold for the speech rate parameter comprises a low speech rate level and a high speech rate level.

14. The wearable speech-assisting device of claim 1, wherein the processor is further configured to:

record and store at least a portion of the audio signals, the wearer's speech signal, and/or feedback data.

15. The wearable speech-assisting device of claim 14, wherein the processor is further configured to:

output at least a portion of the stored data to another computing device for analysis or display.

16. The wearable speech-assisting device of claim 1, wherein the wearable speech-assisting device is embodied as a wearable headset and/or neck device.

17. The wearable speech-assisting device of claim 1, wherein one or more of the plurality of acoustic sensors comprises a micro-electromechanical systems (MEMS) microphone.

18. The wearable speech-assisting device of claim 1, wherein the wearable speech-assisting device is employed as a therapy aid.

19. A method comprising:

receiving a plurality of audio signals including at least a first audio signal via a first acoustic sensor and a second audio signal via a second acoustic sensor;

performing an active beamforming operation or comparative signal operation on the received audio signals to determine whether the received audio signals originated from a wearer and/or reject the audio signals in response to determining that the audio signals originate from another source;

responsive to determining that the received audio signals originated from the wearer, isolating the wearer's speech signal based on a determined difference between respective energy amounts from the first acoustic sensor and the second acoustic sensor;

determining whether the wearer's speech signal satisfies one or more speech parameters, including at least one of an acoustic intensity parameter or a speech rate parameter; and in response to detecting that the wearer's speech signal fails to satisfy at least one predetermined threshold of at least one of the speech parameters for a specified time period, output feedback to the wearer via one or more feedback elements.

20. A non-transitory computer-readable medium comprising a memory having instructions stored thereon to cause a processor to:

receive a plurality of audio signals including at least a first audio signal via a first acoustic sensor and a second audio signal via a second acoustic sensor;

perform an active beamforming operation or comparative signal operation on the received audio signals to determine whether the received audio signals originated from a wearer and/or reject the audio signals in response to determining that the audio signals originate from another source;

responsive to determining that the received audio signals originated from the wearer, isolating the wearer's speech signal based on a determined difference between respective energy amounts from the first acoustic sensor and the second acoustic sensor;

determine whether the wearer's speech signal satisfies one or more speech parameters including at least one of an acoustic intensity parameter or a speech rate parameter; and in response to detecting that the wearer's speech signal fails to satisfy at least one predetermined threshold of at least one of the speech parameters for a specified time period, output feedback to the wearer via one or more haptic feedback elements.

* * * * *